United States Patent
Ko et al.

(10) Patent No.: US 12,185,113 B2
(45) Date of Patent: Dec. 31, 2024

(54) WIRELESS COMMUNICATION METHOD AND WIRELESS COMMUNICATION TERMINAL FOR SPATIAL REUSE OF OVERLAPPED BASIC SERVICE SET

(71) Applicants: WILUS INSTITUTE OF STANDARDS AND TECHNOLOGY INC., Gyeonggi-do (KR); SK TELECOM CO., LTD., Seoul (KR)

(72) Inventors: Geonjung Ko, Gyeonggi-do (KR); Juhyung Son, Gyeonggi-do (KR); Jinsam Kwak, Gyeonggi-do (KR); Woojin Ahn, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

(21) Appl. No.: 18/225,132

(22) Filed: Jul. 23, 2023

(65) Prior Publication Data

US 2023/0370853 A1    Nov. 16, 2023

Related U.S. Application Data

(63) Continuation of application No. 17/481,157, filed on Sep. 21, 2021, now Pat. No. 11,871,241, which is a
(Continued)

(30) Foreign Application Priority Data

Apr. 2, 2016   (KR) ................. 10-2016-0040551
Jun. 14, 2016  (KR) ................. 10-2016-0074091
(Continued)

(51) Int. Cl.
*H04W 16/00*   (2009.01)
*H04W 16/02*   (2009.01)
(Continued)

(52) U.S. Cl.
CPC .......... *H04W 16/02* (2013.01); *H04W 28/20* (2013.01); *H04W 52/146* (2013.01);
(Continued)

(58) Field of Classification Search
CPC ................. H04W 16/02; H04W 28/20; H04W 52/146; H04W 52/34; H04W 24/08;
(Continued)

(56) References Cited

U.S. PATENT DOCUMENTS 8,483,741 B1   7/2013 Hussain et al.
8,971,213 B1   3/2015 Hart
(Continued)

FOREIGN PATENT DOCUMENTS

CA    2 844 598    2/2013
CN    103916943    7/2014
(Continued)

OTHER PUBLICATIONS

Notice of Allowance dated Jul. 31, 2023 for Korean Patent Application No. 10-2022-7030875 and its English translation provided by Applicant's foreign counsel.
(Continued)

*Primary Examiner* — Hashim S Bhatti
(74) *Attorney, Agent, or Firm* — WOMBLE BOND DICKINSON (US) LLP

(57) ABSTRACT

The present invention relates to a wireless communication method and a wireless communication terminal for a spatial reuse operation of an overlapping basic service set, and more particularly, to a wireless communication method and a wireless communication terminal for supporting a spatial
(Continued)

reuse operation of an overlapping basic service set to efficiently use a wireless resource. To this end, provided are a wireless communication terminal including: a processor; and a communication unit, wherein the processor receives a trigger frame indicating an uplink multi-user transmission, and transmits a trigger-based PHY protocol data unit (PPDU) in response to the received trigger frame, wherein the trigger-based PPDU comprises a spatial reuse parameter for spatial reuse operation of an overlapping basic service set (OBSS) terminal and a wireless communication method using the same.

10 Claims, 21 Drawing Sheets

Related U.S. Application Data continuation of application No. 16/813,660, filed on Mar. 9, 2020, now Pat. No. 11,153,759, which is a continuation of application No. 16/141,973, filed on Sep. 26, 2018, now Pat. No. 10,623,964, which is a continuation of application No. PCT/KR2017/003662, filed on Apr. 3, 2017.

(30) Foreign Application Priority Data

Jul. 7, 2016 (KR) .................. 10-2016-0086044
Jul. 23, 2016 (KR) .................. 10-2016-0093813

(51) Int. Cl.
| | | |
|---|---|---|
| *H04W 28/20* | (2009.01) | |
| *H04W 52/14* | (2009.01) | |
| *H04W 52/34* | (2009.01) | |
| *H04W 24/08* | (2009.01) | |
| *H04W 52/24* | (2009.01) | |
| *H04W 72/044* | (2023.01) | |
| *H04W 84/12* | (2009.01) | |
| *H04W 88/02* | (2009.01) | |

(52) U.S. Cl.
CPC ........... *H04W 52/34* (2013.01); *H04W 24/08* (2013.01); *H04W 52/245* (2013.01); *H04W 72/046* (2013.01); *H04W 84/12* (2013.01); *H04W 88/02* (2013.01)

(58) Field of Classification Search
CPC ............. H04W 52/245; H04W 72/046; H04W 84/12; H04W 88/02; H04W 16/10; H04W 74/002; H04W 74/0808; H04W 76/11
See application file for complete search history.

(56) References Cited

U.S. PATENT DOCUMENTS

| | | | |
|---|---|---|---|
| 10,128,966 B1 | 11/2018 | Chu et al. | |
| 10,182,361 B1 * | 1/2019 | Moon | H04W 24/08 |
| 10,631,335 B2 | 4/2020 | Ko et al. | |
| 10,873,973 B2 | 12/2020 | Ko et al. | |
| 2009/0052578 A1 | 2/2009 | Sawai | |
| 2011/0014910 A1 | 1/2011 | Yonge, III et al. | |
| 2012/0063335 A1 | 3/2012 | Cho et al. | |
| 2012/0155350 A1 | 6/2012 | Wentink et al. | |
| 2012/0177365 A1 | 7/2012 | Winzer | |
| 2012/0327915 A1 | 12/2012 | Kang et al. | |
| 2014/0286203 A1 | 9/2014 | Jindal et al. | |
| 2014/0307726 A1 | 10/2014 | Kang et al. | |
| 2015/0023272 A1 | 1/2015 | Choi et al. | |
| 2015/0078299 A1 | 3/2015 | Barriac et al. | |
| 2015/0103767 A1 | 4/2015 | Kim et al. | |
| 2015/0103777 A1 | 4/2015 | Chen et al. | |
| 2015/0110093 A1 | 4/2015 | Asterjadhi et al. | |
| 2015/0181620 A1 | 6/2015 | Seok | |
| 2015/0282043 A1 | 10/2015 | Fang et al. | |
| 2016/0043949 A1 | 2/2016 | Lee et al. | |
| 2016/0050691 A1 | 2/2016 | Jauh et al. | |
| 2016/0088126 A1 | 3/2016 | Doan et al. | |
| 2016/0135225 A1 | 5/2016 | Kwon et al. | |
| 2016/0219461 A1 | 7/2016 | Huang et al. | |
| 2016/0249366 A1 | 8/2016 | Seok | |
| 2016/0330788 A1 | 11/2016 | Zheng et al. | |
| 2016/0353275 A1 | 12/2016 | Liu et al. | |
| 2016/0360549 A1 | 12/2016 | Tayamon et al. | |
| 2016/0374087 A1 | 12/2016 | Liu et al. | |
| 2017/0006541 A1 | 1/2017 | Huang et al. | |
| 2017/0064713 A1 | 3/2017 | Barriac et al. | |
| 2017/0094685 A1 | 3/2017 | Noh et al. | |
| 2017/0142659 A1 | 5/2017 | Noh et al. | |
| 2017/0164371 A1 | 6/2017 | Kim et al. | |
| 2017/0188368 A1 | 6/2017 | Cariou et al. | |
| 2017/0188376 A1 * | 6/2017 | Noh | H04W 52/42 |
| 2017/0201981 A1 | 7/2017 | Huang et al. | |
| 2017/0230981 A1 | 8/2017 | Ryu et al. | |
| 2017/0289819 A1 | 10/2017 | Kim et al. | |
| 2017/0289987 A1 | 10/2017 | Seok | |
| 2017/0295560 A1 | 10/2017 | Kim et al. | |
| 2017/0367129 A1 | 12/2017 | Yang | |
| 2018/0014327 A1 | 1/2018 | Park | |
| 2018/0146426 A1 | 5/2018 | Park | |
| 2018/0146469 A1 | 5/2018 | Luo et al. | |
| 2018/0220456 A1 | 8/2018 | Kim et al. | |
| 2018/0227952 A1 | 8/2018 | Kim et al. | |
| 2018/0317170 A1 | 11/2018 | Cariou | |
| 2018/0317173 A1 | 11/2018 | Kim et al. | |
| 2018/0324859 A1 | 11/2018 | Kim et al. | |
| 2018/0352499 A1 * | 12/2018 | Khoury | H04W 48/08 |
| 2018/0359807 A1 | 12/2018 | Kim et al. | |
| 2019/0028898 A1 | 1/2019 | Ko et al. | |
| 2019/0261419 A1 | 8/2019 | Noh et al. | |
| 2019/0289819 A1 | 9/2019 | Ranck | |
| 2019/0306824 A1 | 10/2019 | Chu et al. | |
| 2019/0327741 A1 | 10/2019 | Li et al. | |
| 2020/0154476 A1 * | 5/2020 | Kim | H04W 74/06 |
| 2020/0213861 A1 | 7/2020 | Ko et al. | |
| 2022/0007196 A1 | 1/2022 | Ko et al. | |

FOREIGN PATENT DOCUMENTS

| | | |
|---|---|---|
| CN | 104321998 | 1/2015 |
| CN | 104471873 | 3/2015 |
| CN | 104488347 | 4/2015 |
| CN | 104853375 | 8/2015 |
| CN | 104904292 | 9/2015 |
| CN | 104954297 | 9/2015 |
| CN | 105072701 | 11/2015 |
| CN | 105379143 | 3/2016 |
| CN | 113950137 | 1/2022 |
| CN | 113950138 | 1/2022 |
| CN | 113950139 | 1/2022 |
| EP | 1 307 061 | 5/2003 |
| EP | 2 230 807 | 9/2010 |
| EP | 3 054 736 | 8/2016 |
| EP | 3 086 484 | 10/2016 |
| KR | 10-2011-0008704 | 1/2011 |
| KR | 10-2013-0005289 | 1/2013 |
| KR | 10-2014-0023850 | 2/2014 |
| KR | 10-2014-0035841 | 3/2014 |
| KR | 10-2014-0036295 | 3/2014 |
| KR | 10-2014-0070528 | 6/2014 |
| KR | 10-2014-0097160 | 8/2014 |
| KR | 10-2014-0130113 | 11/2014 |
| KR | 10-2015-0052798 | 5/2015 |
| KR | 10-2015-0054625 | 5/2015 |
| KR | 10-1517321 | 5/2015 |
| KR | 10-1534865 | 7/2015 |
| KR | 10-1553857 | 9/2015 |
| KR | 10-1558112 | 10/2015 |
| KR | 10-1561117 | 10/2015 |
| KR | 10-2015-0123683 | 11/2015 |

(56) References Cited

FOREIGN PATENT DOCUMENTS

| KR | 10-2015-0124389 | 11/2015 |
|---|---|---|
| KR | 10-2016-0006235 | 1/2016 |
| KR | 10-2016-0006681 | 1/2016 |
| KR | 10-2016-0018351 | 2/2016 |
| KR | 10-2016-0019867 | 2/2016 |
| KR | 10-2016-0027215 | 3/2016 |
| KR | 10-2016-0031542 | 3/2016 |
| KR | 10-2016-0004950 | 4/2016 |
| KR | 10-2016-0047405 | 5/2016 |
| KR | 10-1617410 | 5/2016 |
| KR | 10-2016-0064003 | 6/2016 |
| KR | 10-1632894 | 6/2016 |
| KR | 10-2019-0105666 | 9/2019 |
| KR | 10-2019-0112193 | 10/2019 |
| KR | 10-2020-0033915 | 3/2020 |
| KR | 10-2121049 | 6/2020 |
| KR | 10-2021-0110403 | 9/2021 |
| KR | 10-2021-0158886 | 12/2021 |
| KR | 10-2344180 | 12/2021 |
| WO | 2009/089241 | 7/2009 |
| WO | 2011/102651 | 8/2011 |
| WO | 2012/165733 | 12/2012 |
| WO | 2013/130793 | 9/2013 |
| WO | 2013/162280 | 10/2013 |
| WO | 2014/107031 | 7/2014 |
| WO | 2015/050311 | 4/2015 |
| WO | 2015/060514 | 4/2015 |
| WO | 2015/076532 | 5/2015 |
| WO | 2015/081169 | 6/2015 |
| WO | 2015/093704 | 6/2015 |
| WO | 2015/112780 | 7/2015 |
| WO | 2015/120488 | 8/2015 |
| WO | 2015/133648 | 9/2015 |
| WO | 2015/137618 | 9/2015 |
| WO | 2015/171790 | 11/2015 |
| WO | 2015/198157 | 12/2015 |
| WO | 2016/003056 | 1/2016 |
| WO | 2016/029876 | 3/2016 |
| WO | 2016/036138 | 3/2016 |
| WO | 2016/040837 | 3/2016 |
| WO | 2016/044652 | 3/2016 |
| WO | 2016/048098 | 3/2016 |
| WO | 2016/087917 | 6/2016 |
| WO | 2017/012182 | 1/2017 |
| WO | 2017/171530 | 10/2017 |
| WO | 2017/171531 | 10/2017 |

OTHER PUBLICATIONS

Notice of Allowance dated Jun. 30, 2023 for Vietnamese Patent Application No. 1-2018-04927 and its English translation provided by Applicant's foreign counsel.
Office Action dated Aug. 25, 2023 for Korean Patent Application No. 10-2022-7028595 and its English translation provided by Applicant's foreign counsel.
Office Action dated Aug. 28, 2023 for Japanese Patent Application No. 2022-000535 and its English translation provided by Applicant's foreign counsel.
Jianhan Liu, Mediatek, et al.: "AID Assign Rule Based on BSS Color and HE Operation Element", doc.: IEEE 802.11-16/0364r2, Mar. 11, 2016, slides 1-19.
Office Action dated Sep. 20, 2023 for U.S. Appl. No. 17/714,142.
International Search Report for PCT/KR2017/003661 mailed on Jul. 13, 2017 and its English translation from WIPO (published as WO 2017/171530).
Written Opinion of the International Searching Authority for PCT/KR2017/003661 mailed on Jul. 13, 2017 and its English translation from WIPO (published as WO 2017/171530).
International Preliminary Report on Patentability (Chapter I) issued on Oct. 2, 2018 for PCT/KR2017/003661 and its English translation from WIPO.
International Search Report for PCT/KR2017/003662 mailed on Jun. 30, 2017 and its English translation from WIPO (published as WO 2017/171531).
Written Opinion of the International Searching Authority for PCT/KR2017/003662 mailed on Jun. 30, 2017 and its English translation from WIPO (published as WO 2017/171531).
International Preliminary Report on Patentability (Chapter I) issued on Oct. 2, 2018 for PCT/KR2017/003662 and its English translation from WIPO.
Huawei et al., "Discussions on Spatial Reuse Operations in 11ax", doc.: IEEE 802.11/0382r0, slides 1-18, Mar. 14, 2016, see slide 12, 15.
Wilus, "Issues on BSS Color Bits Collision", doc.: IEEE 802.11-16/0396r0. See slides 1-18, Mar. 14, 2016, see slide 6.
Notice of Allowance dated Dec. 11, 2019 for U.S. Appl. No. 16/141,977 (now published as US 2019/0029039).
Non-Final Office Action dated Jan. 22, 2020 for U.S. Appl. No. 16/219,937 (now published as US 2019/0132872).
Final Office Action dated Nov. 26, 2019 for U.S. Appl. No. 15/968,681 (now published as US 2018/0249501).
Notice of Allowance dated Feb. 3, 2020 for Japanese Patent Application No. 2019-503179 and its English translation provided by Applicant's foreign council.
Robert Stacey, "Specification Framework for Tgax", IEEE P802.11 Wireless LANs, IEEE 802.11-15/0132r15, Mar. 17, 2016, pp. 1-49.
Jianhan Liu, Mediatek, et al., "AID Assign Rule Based on BSS Color and HE Operation Element", IEEE 802.11-16/03640, Mar. 11, 2016, pp. 1-19.
Jianhan Liu, Mediatek, et al., "AID Assign Rule Based on BSS Color and HE Operation Element", IEEE 802.11-16/0364r1, Mar. 11, 2016, pp. 1-19.
Jianhan Liu, Mediatek, et al., "AID Assign Rule Based on BSS Color and HE Operation Element", IEEE 802.11-16/0364r2, Mar. 11, 2016, pp. 1-19.
Jianhan Liu, Mediatek, et al., "AID Assign Rule Based on BSS Color and HE Operation Element", IEEE 802.11-16/0364r3, Mar. 11, 2016, pp. 1-19.
Jianhan Liu, Mediatek Inc., et al., "Spec Text for HE Operation element and AID Assign Rule", IEEE P802.11 Wireless LANs, IEEE 802.11-16/0884r0, filed Jul. 10, 2016, pp. 1-3.
Jianhan Liu, Mediatek Inc., et al., "Spec Text for HE Operation element and AID Assign Rule", IEEE P802.11 Wireless LANs, IEEE 802.11-16/0884r1, Jul. 10, 2016, pp. 1-3.
Jianhan Liu, Mediatek Inc., et al., "Spec Text for HE Operation element and AID Assign Rule", IEEE P802.11 Wireless LANs, IEEE 802.11-16/0884r5, Sep. 12, 2016, pp. 1-3.
Geonjung KO et al., Wilus, "Discussions on Partial BSS Color", IEEE 802.11-16/0918r0, slides 1-9.
Geonjung KO, Wilus, et al., "Discussions on Partial BSS Color", IEEE 802.11-16/0918r1, slides 1-14.
Geonjung KO, Wilus, et al., "Text for Partial BSS Color and AID Assignment Rule", IEEE P802.11 Wireless LANs, IEEE 802.11-16/1236r0, Sep. 12, 2016, pp. 1-3.
Office Action dated Jun. 28, 2019 for U.S. Appl. No. 15/968,681 (now published as US 2018/0249501).
Office Action dated Sep. 9, 2019 for Japanese Patent Application No. 2019-503179 and its English translation provided by the Applicant's foreign counsel.
Extended European Search Report dated Oct. 17, 2019 for EP Patent Application No. 17775954.5.
Corrected Notice of Allowance dated Feb. 6, 2020 for U.S. Appl. No. 16/141,973 (now published as US 2019/0028898).
Notice of Allowance dated Dec. 11, 2019 for U.S. Appl. No. 16/141,973 (now published as US 2019/0028898).
Notice of Allowance dated Jul. 3, 2020 for Korean Patent Application No. 10-2020-7018343 and its English translation provided by Applicant's foreign counsel.
Office Action dated Jul. 3, 2020 for Korean Patent Application No. 10-2020-7018342 and its English translation provided by Applicant's foreign counsel.
Office Action dated Jul. 7, 2020 for Korean Patent Application No. 10-2020-7018344 and its English translation provided by Applicant's foreign counsel.

(56) References Cited

OTHER PUBLICATIONS

Office Action dated Jul. 7, 2020 for Korean Patent Application No. 10-2020-7018345 and its English translation provided by Applicant's foreign counsel.
Office Action dated Aug. 7, 2020 for Indian Patent Application No. 201827035699.
Notice of Allowance dated Aug. 19, 2020 for U.S. Appl. No. 16/219,937.
Office Action dated Feb. 23, 2021 for U.S. Appl. No. 16/813,670.
Office Action dated Mar. 16, 2021 for Korean Patent Application No. 10-2018-7036233 and its English translation provided by Applicant's foreign counsel.
Rossi Jun Luo et al.: "OBSS NAV and PD Threshold Rule for Spatial Reuse", IEEE 802.11-15/1109r1, Huawei, Broadcom, et al. Sep. 13, 2015, slides 1-20.
Office Action dated May 20, 2021 for Korean Patent Application No. 10-2021-7010349 and its English translation provided by Applicant's foreign counsel.
Office Action dated May 20, 2021 for Korean Patent Application No. 10-2021-7010350 and its English translation provided by Applicant's foreign counsel.
Office Action dated Jan. 25, 2021 for Chinese Patent Application No. 201680063960.X and its English translation provided by Applicant's foreign counsel.
Office Action dated Jun. 17, 2021 for U.S. Appl. No. 16/813,670 (published as US 2020/0214037).
Extended European Search Report dated May 3, 2021 for European Patent Application No. 21162615.5.
Office Action dated Aug. 30, 2021 for Korean Patent Application No. 10-2018-7012484 and its English translation provided by Applicant's foreign counsel.
Notice of Allowance dated Jun. 7, 2021 for U.S. Appl. No. 16/813,660 (now published as US 2020/0213861).
Notice of Allowance dated May 12, 2021 for U.S. Appl. No. 16/813,660 (now published as US 2020/0213861).
Office Action dated Apr. 3, 2023 for U.S. Appl. No. 17/970,768.
Office Action dated May 12, 2023 for Korean Patent Application No. 10-2022-7019969 and its English translation provided by Applicant's foreign counsel.
Notice of Allowance dated Jun. 21, 2023 for Korean Patent Application No. 10-2022-7038365 and its English translation provided by Applicant's foreign counsel.
John (Ju-Hyung) Son et al.: "HE Trigger Frame Format", doc.: IEEE 802.11-15/0851r0, Jul. 13, 2015, pp. 1-10.
Kiseon Ryu et al.: "CCA consideration for UL MU transmission", doc.: IEEE 802.11-15/1058r0, Sep. 13, 2015, slides 1-16.
Office Action dated Jan. 23, 2023 for Japanese Patent Application No. 2022-000535 and its English translation provided by Applicant's foreign counsel.
Notice of Allowance dated Mar. 17, 2023 for Korean Patent Application No. 10-2022-7038365 and its English translation provided by Applicant's foreign counsel.
Notice of Allowance dated Apr. 4, 2023 for U.S. Appl. No. 17/715,040.
Notice of Allowance dated Sep. 8, 2022 for Korean Patent Application No. 10-2022-7006593 and its English translation provided by Applicant's foreign counsel.
Notice of Allowance dated Sep. 8, 2022 for Korean Patent Application No. 10-2022-7006595 and its English translation provided by Applicant's foreign counsel.
Office Action dated Sep. 28, 2022 for Korean Patent Application No. 10-2022-7028595 and its English translation provided by Applicant's foreign counsel.
Office Action dated Oct. 19, 2022 for Korean Patent Application No. 10-2022-7030875 and its English translation provided by Applicant's foreign counsel.
Extended European Search Report dated Nov. 22, 2022 for European Patent Application No. 22190161.4.
Notice of Allowance dated May 19, 2022 for Korean Patent Application No. 10-2021-7010350 and its English translation provided by Applicant's foreign counsel.

Office Action dated Apr. 29, 2022 for Vietnamese Patent Application No. 1-2018-04927 and its English translation provided by Applicant's foreign counsel.
Notice of Allowance dated Apr. 8, 2021 for U.S. Appl. No. 16/812,375.
Office Action dated Apr. 12, 2021 for U.S. Appl. No. 16/813,675.
Notice of Allowance dated Jul. 2, 2021 for Chinese Patent Application No. 201680063960.X and its English translation provided by Applicant's foreign counsel.
Notice of Allowance dated Jun. 7, 2022 for U.S. Appl. No. 17/113,029.
Notice of Allowance dated Jun. 15, 2022 for U.S. Appl. No. 17/113,026.
Office Action dated Sep. 17, 2021 for U.S. Appl. No. 16/813,675.
Office Action dated Oct. 18, 2021 for U.S. Appl. No. 17/113,026.
Office Action dated Oct. 18, 2021 for U.S. Appl. No. 17/113,029.
Notice of Allowance dated Sep. 23, 2021 for Korean Patent Application No. 10-2018-7036233 and its English translation provided by Applicant's foreign counsel.
Office Action dated Sep. 16, 2021 for Chinese Patent Application No. 201780022351.4 and its English translation provided by Applicant's foreign counsel.
Notice of Allowance dated Dec. 3, 2021 for Korean Patent Application No. 10-2018-7012484 and its English translation provided by Applicant's foreign counsel.
Notice of Allowance dated Dec. 6, 2021 for Japanese Patent Application No. 2020-035789 and its English translation provided by Applicant's foreign counsel.
Office Action dated Oct. 15, 2021 for Chinese Patent Application No. 201780021591.2 and its English translation provided by Applicant's foreign counsel.
Notice of Allowance dated Nov. 1, 2021 for Japanese Patent Application No. 2020-035788 and its English translation provided by Applicant's foreign counsel.
Notice of Allowance dated Oct. 5, 2021 for U.S. Appl. No. 16/813,670.
Corrected Notice of Allowance dated Nov. 10, 2021 for U.S. Appl. No. 16/813,670.
Notice of Allowance dated Mar. 11, 2022 for Korean Patent Application No. 10-2021-7010349 and its English translation provided by Applicant's foreign counsel.
Office Action dated Mar. 25, 2022 for Korean Patent Application No. 10-2021-7010350 and its English translation provided by Applicant's foreign counsel.
Office Action dated Mar. 29, 2022 for Indian Patent Application No. 202128006337.
Notice of Allowance dated Apr. 6, 2022 for Chinese Patent Application No. 201780021591.2 and its English translation provided by Applicant's foreign counsel.
Notice of Allowance dated Mar. 29, 2022 for European Patent Application No. 21 162 615.5.
Notice of Allowance dated May 5, 2022 for Chinese Patent Application No. 201780022351.4 and its English translation provided by Applicant's foreign counsel.
Notice of Allowance dated Jul. 8, 2022 for Korean Patent Application No. 10-2021-7042356 and its English translation provided by Applicant's foreign counsel.
Office Action dated Jul. 25, 2022 for Korean Patent Application No. 10-2022-7019969 and its English translation provided by Applicant's foreign counsel.
Final Office Action dated Feb. 22, 2022 for U.S. Appl. No. 17/113,026.
Final Office Action dated Feb. 22, 2022 for U.S. Appl. No. 17/113,029.
Office Action dated Mar. 11, 2022 for Korean Patent Application No. 10-2022-7006593 and its English translation provided by Applicant's foreign counsel.
Office Action dated Mar. 11, 2022 for Korean Patent Application No. 10-2022-7006595 and its English translation provided by Applicant's foreign counsel.
Notice of Allowance dated Jan. 28, 2022 for Korean Patent Application No. 10-2021-7042355 and its English translation provided by Applicant's foreign counsel.
Notice of Allowance dated Feb. 3, 2022 for U.S. Appl. No. 16/942,765.
Notice of Allowance dated Feb. 8, 2022 for U.S. Appl. No. 16/942,764.

(56) References Cited

OTHER PUBLICATIONS

Notice of Allowance dated Apr. 4, 2023 for U.S. Appl. No. 17/481,157 (now published as US 2022/0007196).
Office Action dated Nov. 30, 2022 for U.S. Appl. No. 17/481,157 (now published as US 2022/0007196).
Extended European Search Report dated Sep. 6, 2023 for European Patent Application No. 22190161.4.
Notice of Allowance dated Apr. 16, 2024 for Korean Patent Application No. 10-2022-7019969 and its English translation provided by Applicant's foreign counsel.
Office Action dated Apr. 19, 2024 for Korean Patent Application No. 10-2023-7037567 and its English translation provided by Applicant's foreign counsel.
Office Action dated May 1, 2024 for U.S. Appl. No. 18/381,167.
Notice of Hearing dated Jan. 25, 2024 for Indian Patent Application No. 202128006337.
Office Action dated Feb. 7, 2024 for U.S. Appl. No. 17/714,142.
Notice of Allowance dated Feb. 13, 2024 for Japanese Patent Application No. 2022-000535 and its English translation provided by Applicant's foreign counsel.
Office Action dated Feb. 8, 2024 for Chinese Patent Application No. 202111085909.8 and its English translation provided by Applicant's foreign counsel.
Geonjung Ko et al.: "Discussions on Spatial Reuse Enhancement", doc.: IEEE 802.11-15/1118r0, Sep. 14, 2015, slides 1-8.
Office Action dated Feb. 8, 2024 for Chinese Patent Application No. 202111085876.7 and its English translation provided by Applicant's foreign counsel.
Imad Jamil et al.: "Efficient MAC Protocols Optimization for Future High Density WLANS", 2015 IEEE Wireless Communication and Networking Conference (WCNC 2015), Jul. 18, 2015, pp. 1054-1059.
Ericsson: "Additional Control Procedure during Inter-BSS Handover", 3GPP TSG CT Meeting #55, CP-120207, Xiam, People's Republic of China, Mar. 4, 2012, pp. 1-25.
ITRI: "Correction of serving cell UL/DL configuration for transmitting the PUSCH", 3GPP TSG-RAN WG1 Meeting #72bis, R1-131072, Chicago, USA, Apr. 5, 2013, pp. 1-8.
Office Action dated Feb. 7, 2024 for Chinese Patent Application No. 202111085887.5 and its English translation provided by Applicant's foreign counsel.
Office Action dated Jun. 13, 2024 for Chinese Patent Application No. 202111085909.8 and its English translation provided by Applicant's foreign counsel.
Office Action dated Jun. 14, 2024 for Chinese Patent Application No. 202111085887.5 and its English translation provided by Applicant's foreign counsel.
Office Action dated Jun. 14, 2024 for Chinese Patent Application No. 202111085876.7 and its English translation provided by Applicant's foreign counsel.
Notice of Allowance dated Jul. 29, 2024 for U.S. Appl. No. 17/714,142.
Notice of Allowance dated Aug. 23, 2024 for Korean Patent Application No. 10-2022-7028595 and its English translation provided by Applicant's foreign counsel.
Notice of Allowance dated Sep. 6, 2024 for Chinese Patent Application No. 202111085909.8 and its English translation provided by Applicant's foreign counsel.
Notice of Allowance dated Sep. 12, 2024 for Chinese Patent Application No. 202111085876.7 and its English translation provided by Applicant's foreign counsel.
Notice of Allowance dated Sep. 12, 2024 for Chinese Patent Application No. 202111085887.5 and its English translation provided by Applicant's foreign counsel.
Extended European Search Report dated Sep. 16, 2024 for European Patent Application No. 24191556.0.
Office Action dated Oct. 28, 2024 for Japanese Patent Application No. 2023-222901 and its English translation provided by Applicant's foreign counsel.
Robert Stacey: "Specification Framework for TGax", doc.: IEEE 802.11-15/0132r16, Mar. 17, 2016, pp. 1-50.

\* cited by examiner

| Field | Length (bits) | Description for 20 MHz | Description for 40 MHz | Description for 80 MHz | Description for 160 MHz |
|---|---|---|---|---|---|
| Spatial Reuse 1 | 4 | Corresponding to entire 20 MHz | Corresponding to 20 MHz (20MHz channel 1) | Corresponding to 20 MHz (20MHz channel 1) | Corresponding to 40 MHz (40MHz channel 1) |
| Spatial Reuse 2 | 4 | Same with Spatial Reuse 1 field | Corresponding to 20 MHz (20MHz channel 2) | Corresponding to 20 MHz (20MHz channel 2) | Corresponding to 40 MHz (40MHz channel 2) |
| Spatial Reuse 3 | 4 | Same with Spatial Reuse 1 field | Same with Spatial Reuse 1 field | Corresponding to 20 MHz (20MHz channel 3) | Corresponding to 40 MHz (40MHz channel 3) |
| Spatial Reuse 4 | 4 | Same with Spatial Reuse 1 field | Same with Spatial Reuse 2 field | Corresponding to 20 MHz (20MHz channel 4) | Corresponding to 40 MHz (40MHz channel 4) |

*FIG. 13*

| Channel 4b | 20 MHz |
|---|---|
| Channel 4a | 20 MHz |
| Channel 3b | 20 MHz |
| Channel 3a | 20 MHz |
| Channel 2b | 20 MHz |
| Channel 2a | 20 MHz |
| Channel 1b | 20 MHz |
| Channel 1a | 20 MHz |

- Channels 4b, 4a → SR Field 4
- Channels 3b, 3a → SR Field 3
- Channels 2b, 2a → SR Field 2
- Channels 1b, 1a → SR Field 1

*FIG. 14*

| Field | Length (bits) | Description for 160 MHz | Description for 80+80 MHz |
|---|---|---|---|
| Spatial Reuse 1 | 4 | Corresponding to 40 MHz (40MHz channel 1) | Representative value corresponding to 40MHz channel 1 and 3 |
| Spatial Reuse 2 | 4 | Corresponding to 40 MHz (40MHz channel 2) | Representative value corresponding to 40MHz channel 2 and 4 |
| Spatial Reuse 3 | 4 | Corresponding to 40 MHz (40MHz channel 3) | Representative value corresponding to 40MHz channel 1 and 3 |
| Spatial Reuse 4 | 4 | Corresponding to 40 MHz (40MHz channel 4) | Representative value corresponding to 40MHz channel 2 and 4 |

*FIG. 20*

| Field | Length (bits) | Description for 80+80 MHz |
|---|---|---|
| Spatial Reuse 1 | 4 | Corresponding to 40 MHz (40MHz channel 1) |
| Spatial Reuse 2 | 4 | Corresponding to 40 MHz (40MHz channel 2) |
| Spatial Reuse 3 | 4 | Corresponding to 40 MHz (40MHz channel 3) |
| Spatial Reuse 4 | 4 | Corresponding to 40 MHz (40MHz channel 4) |

STA chooses a minimum between two.

STA chooses a minimum between two.

FIG. 21

| Field | Length (bits) | Description for 20 MHz | Description for 40 MHz | Description for 80 MHz | Description for 160 MHz |
|---|---|---|---|---|---|
| Spatial Reuse 1 | 4 | Corresponding to entire 20 MHz | Corresponding to 20 MHz (20MHz channel 1) | Corresponding to 20 MHz (20MHz channel 1) | Corresponding to 20 MHz (20MHz channel 1) |
| Spatial Reuse 2 | 4 | Same with Spatial Reuse 1 field | Corresponding to 20 MHz (20MHz channel 2) | Corresponding to 20 MHz (20MHz channel 2) | Corresponding to 20 MHz (20MHz channel 2) |
| Spatial Reuse 3 | 4 | Same with Spatial Reuse 1 field | Same with Spatial Reuse 1 field | Corresponding to 20 MHz (20MHz channel 3) | Corresponding to 20 MHz (20MHz channel 3) |
| Spatial Reuse 4 | 4 | Same with Spatial Reuse 1 field | Same with Spatial Reuse 2 field | Corresponding to 20 MHz (20MHz channel 4) | Corresponding to 20 MHz (20MHz channel 4) |
| Spatial Reuse 1 (for another 80MHz Ch.) | 4 | None | None | None | Corresponding to 20 MHz (20MHz channel 5) |
| Spatial Reuse 2 (for another 80MHz Ch.) | 4 | None | None | None | Corresponding to 20 MHz (20MHz channel 6) |
| Spatial Reuse 3 (for another 80MHz Ch.) | 4 | None | None | None | Corresponding to 20 MHz (20MHz channel 7) |
| Spatial Reuse 4 (for another 80MHz Ch.) | 4 | None | None | None | Corresponding to 20 MHz (20MHz channel 8) |

FIG. 23

| BW field value | Description |
|---|---|
| 0 | 20 MHz |
| 1 | 40 MHz |
| 2 | 80 MHz |
| 3 | Contiguous 160 MHz |
| 4 | Non-contiguous 160 MHz |
| 5 | Reserved |
| 6 | Reserved |
| 7 | Reserved |

*FIG. 24*

WIRELESS COMMUNICATION METHOD AND WIRELESS COMMUNICATION TERMINAL FOR SPATIAL REUSE OF OVERLAPPED BASIC SERVICE SET

CROSS-REFERENCE TO RELATED APPLICATIONS

This application is a continuation of U.S. patent application Ser. No. 17/481,157 filed on Sep. 21, 2021, which is a continuation of U.S. patent application Ser. No. 16/813,660 filed on Mar. 9, 2020, now issued as U.S. Pat. No. 11,153,759 on Oct. 19, 2021, which is a continuation of U.S. patent application Ser. No. 16/141,973 filed on Sep. 26, 2018, issued as U.S. Pat. No. 10,623,964 on Apr. 14, 2020, which is a continuation of International Patent Application No. PCT/KR2017/003662 filed on Apr. 3, 2017, which claims the priority to Korean Patent Application No. 10-2016-0040551 filed in the Korean Intellectual Property Office on Apr. 2, 2016, Korean Patent Application No. 10-2016-0074091 filed in the Korean Intellectual Property Office on Jun. 14, 2016, Korean Patent Application No. 10-2016-0086044 filed in the Korean Intellectual Property Office on Jul. 7, 2016, and Korean Patent Application No. 10-2016-0093813 filed in the Korean Intellectual Property Office on Jul. 23, 2016, the entire contents of which are incorporated herein by reference.

TECHNICAL FIELD

The present invention relates to a wireless communication method and a wireless communication terminal for a spatial reuse operation of an overlapping basic service set, and more particularly, to a wireless communication method and a wireless communication terminal for supporting a spatial reuse operation of an overlapping basic service set to efficiently use a wireless resource.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention has an object to provide high-efficiency/high-performance wireless LAN communication in a high-density environment as described above.

The present invention has an object to solve an ambiguity of a spatial reuse field identification of an inter-BSS (or an overlapping BSS) terminal receiving a trigger-based PPDU.

The present invention has an object to provide a wireless communication method and a wireless communication terminal in a high density environment including an overlapping basic service set.

Technical Solution

In order to achieve the objects, the present invention provides a wireless communication method and a wireless communication terminal as below.

First, an exemplary embodiment of the present invention provides a wireless communication terminal, the terminal including: a processor; and a communication unit, wherein the processor receives a trigger frame indicating an uplink multi-user transmission, and transmits a trigger-based PHY protocol data unit (PPDU) in response to the received trigger frame, wherein the trigger-based PPDU comprises a spatial reuse parameter for spatial reuse operation of an overlapping basic service set (OBSS) terminal.

In addition, an exemplary embodiment of the present invention provides a wireless communication method of a wireless communication terminal, including: receiving a trigger frame indicating an uplink multi-user transmission; and transmitting a trigger-based PHY protocol data unit (PPDU) in response to the received trigger frame; wherein the trigger-based PPDU comprises a spatial reuse parameter for spatial reuse operation of an overlapping basic service set (OBSS) terminal.

When a total bandwidth thorough which the transmission of the trigger-based PPDU is performed is a non-contiguous first frequency band and second frequency band, a spatial reuse parameter for the first frequency band and a spatial reuse parameter for the second frequency band may be set to the same value.

A high efficiency signal field A (HE-SIG-A) of the trigger-based PPDU may contain a plurality of spatial reuse fields, and the plurality of spatial reuse fields may carry spatial reuse parameters obtained from the trigger frame, and each of the plurality of spatial reuse fields may indicate a spatial reuse parameter for an individual subband constituting the total bandwidth on which the transmission of the trigger-based PPDU is performed.

The plurality of spatial reuse fields may comprise a first spatial reuse field, a second spatial reuse field, a third spatial reuse field, and a fourth spatial reuse field, and when the total bandwidth on which the transmission of the trigger-based PPDU is performed is a non-contiguous first frequency band and second frequency band, the first spatial reuse field and the second spatial reuse field for the first frequency band may be respectively set to the same value as the third spatial reuse field and the fourth spatial reuse field for the second frequency band.

When the total bandwidth on which the transmission of the trigger-based PPDU is performed is less than or equal to a predetermined bandwidth, the spatial reuse field may indicate a spatial reuse parameter for a subband of a first frequency bandwidth, and when the total bandwidth on which the transmission of the trigger-based PPDU is performed exceeds the predetermined bandwidth, the spatial reuse field may indicate a spatial reuse parameter for a subband of a second frequency bandwidth which is wider than the first frequency bandwidth.

The spatial reuse parameter may be set based on a transmission power of a PPDU containing the trigger frame and an acceptable interference level of a base wireless communication terminal that transmitted the PPDU containing the trigger frame.

The spatial reuse operation of the OBSS terminal may comprise an operation of adjusting a transmission power of the OBSS terminal based on the spatial reuse parameter.

The operation of adjusting the transmission power may be performed based on a received signal strength of a PPDU containing the trigger frame measured by the OBSS terminal and a spatial reuse parameter obtained by the OBSS terminal.

The transmission power of the OBSS terminal may be set to be lower than a value obtained by subtracting the measured received signal strength from the obtained spatial reuse parameter value.

The OBSS terminal may obtain the spatial reuse parameter from at least one of the trigger frame and the trigger-based PPDU.

Advantageous Effects

According to an embodiment of the present invention, the ambiguity of the spatial reuse field identification of an inter-BSS (or an overlapping BSS) terminal receiving a trigger-based PPDU can be solved.

In addition, according to an embodiment of the present invention, if the received frame is determined as an inter-BSS frame, the spatial reuse operation can be performed, thereby efficiently using the wireless resources.

According to an embodiment of the present invention, it is possible to increase the total resource utilization rate in the contention-based channel access system and improve the performance of the wireless LAN system.

DESCRIPTION OF DRAWINGS

FIG. 13 illustrates a method for signaling spatial reuse fields of a trigger-based PPDU according to the embodiment of the present invention.

FIG. 14 illustrates an embodiment of a method for setting spatial reuse fields of a trigger-based PPDU.

FIG. 20 illustrates another embodiment of a method for setting spatial reuse fields of a trigger-based PPDU.

FIG. 21 illustrates yet another embodiment of a method for setting and using spatial reuse fields of a trigger-based PPDU.

FIG. 23 illustrates a method for signaling spatial reuse fields of a trigger-based PPDU according to another embodiment of the present invention.

FIG. 24 illustrates a method for signaling a bandwidth field according to an embodiment of the present invention.

DETAILED DESCRIPTION OF THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2016-0040551, 10-2016-0074091, 10-2016-0086044 and 10-2016-0093813 filed in the Korean Intellectual Property Office and the embodiments and mentioned items described in the respective application, which forms the basis of the priority, shall be included in the Detailed Description of the present application.

Figure 1:
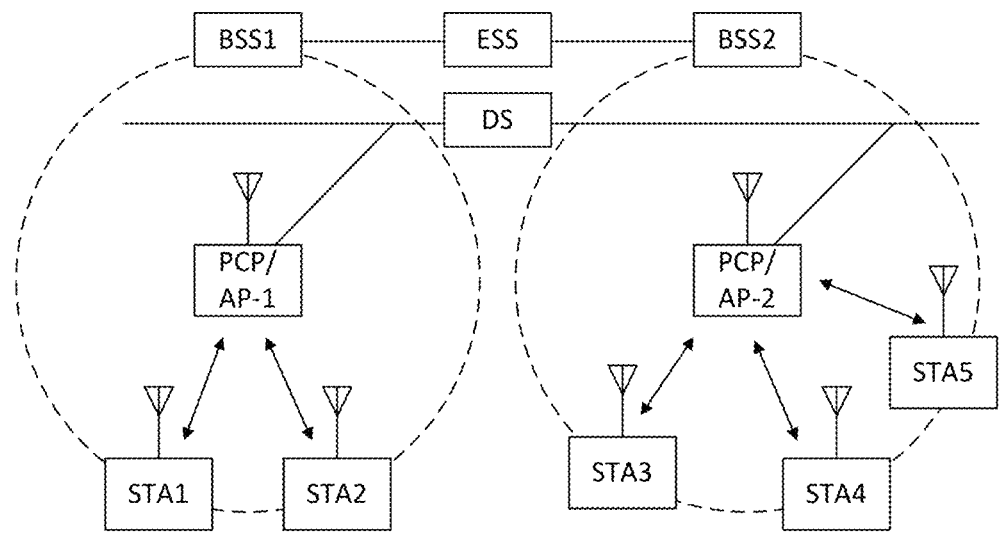
FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
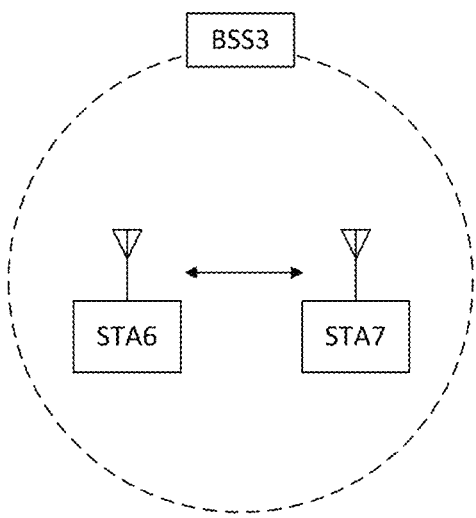
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
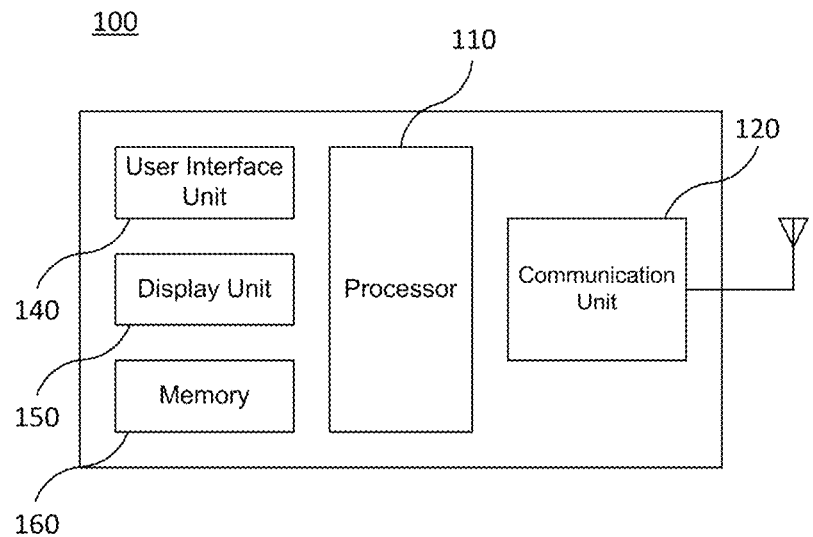
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, and 60 GHz. According to an embodiment, the station 100 may include a communication module using a frequency band of 6 GHz or more and a communication module using a frequency band of 6 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
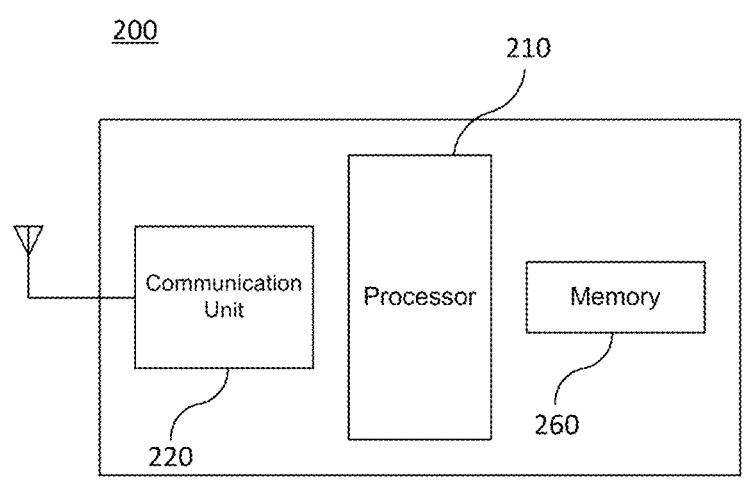
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, and 60 GHz together. Preferably, the AP 200 may include a communication module using a frequency band of 6 GHz or more and a communication module using a frequency band of 6 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
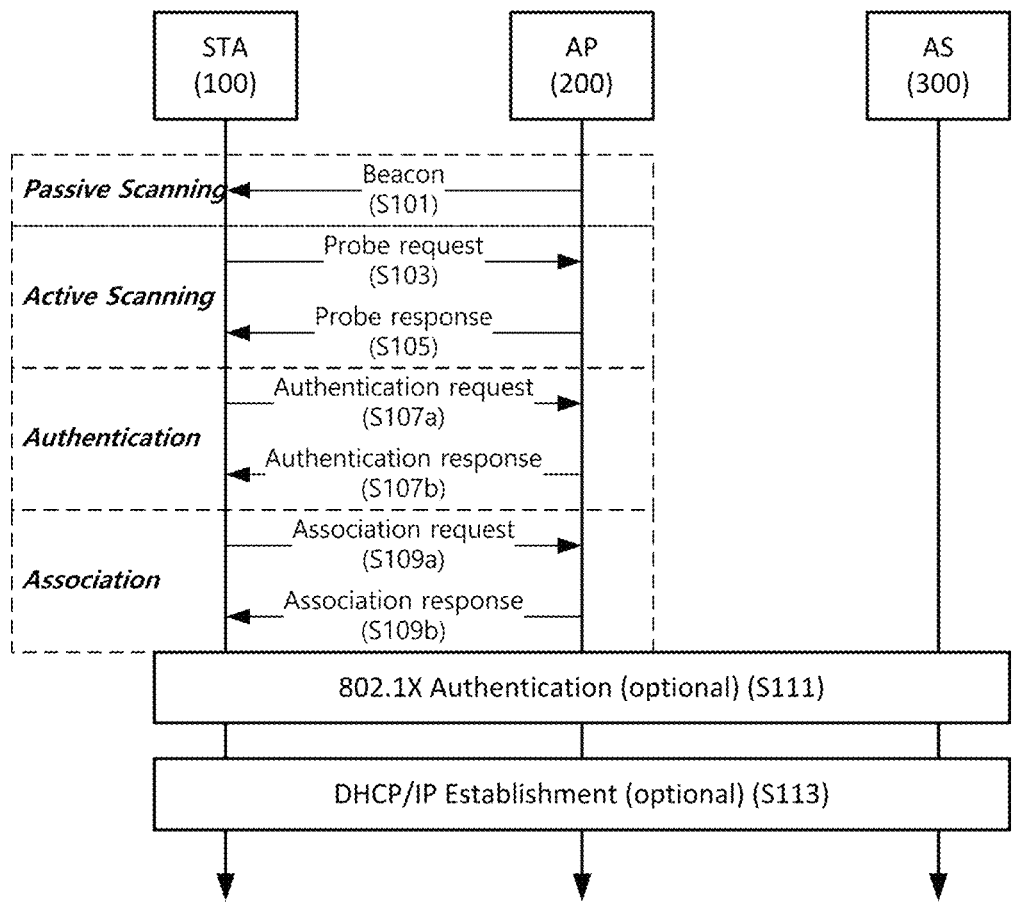
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
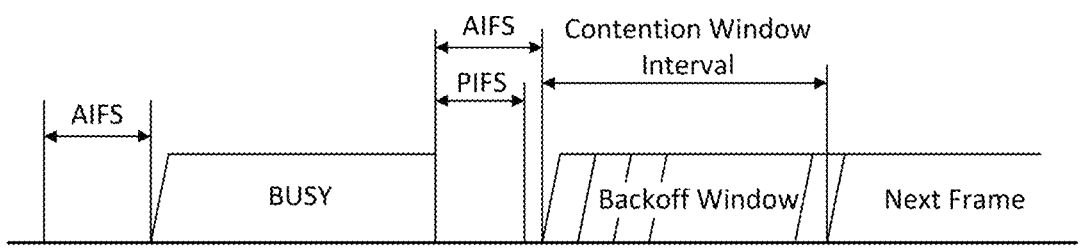
FIG. 6 illustrates a carrier sense multiple access (CSMA)/collision avoidance (CA) method used in wireless LAN communication.

FIG. 6 illustrates a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal has previously used. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Multi-User Transmission When using orthogonal frequency division multiple access (OFDMA) or multi-input multi-output (MIMO), one wireless communication terminal can simultaneously transmit data to a plurality of wireless communication terminals. Further, one wireless communication terminal can simultaneously receive data from a plurality of wireless communication terminals. For example, a downlink multi-user (DL-MU) transmission in which an AP simultaneously transmits data to a plurality of STAs, and an uplink multi-user (UL-MU) transmission in which a plurality of STAs simultaneously transmit data to the AP may be performed.

In order to perform the UL-MU transmission, the channel to be used and the transmission start time of each STA that performs uplink transmission should be adjusted. According to an embodiment of the present invention, the UL-MU transmission process may be managed by the AP. The UL-MU transmission may be performed in response to a trigger frame transmitted by the AP. The trigger frame indicates a UL-MU transmission of at least one STA. The STAs simultaneously transmit uplink data a predetermined IFS time after receiving the trigger frame. The trigger frame may indicate data transmission time point of uplink transmission STAs and may inform channel (or subchannel) information allocated to the uplink transmission STAs. When the AP transmits a trigger frame, a plurality of STAs transmit uplink data through each allocated subcarrier at the time specified by the trigger frame. After the uplink data transmission is completed, the AP transmits an ACK to STAs that have successfully transmitted uplink data. In this case, the AP may transmit a predetermined multi-STA block ACK (M-BA) as an ACK for a plurality of STAs.

In the non-legacy wireless LAN system, a specific number, for example, 26, 52, or 106 tones may be used as a resource unit (RU) for a subchannel-based access in a channel of 20 MHz band. Accordingly, the trigger frame may indicate identification information of each STA participating in the UL-MU transmission and information of the allocated resource unit. The identification information of the STA includes at least one of an association ID (AID), a partial AID, and a MAC address of the STA. Further, the information of the resource unit includes the size and placement information of the resource unit.

Spatial Reuse Operation

Figure 7:
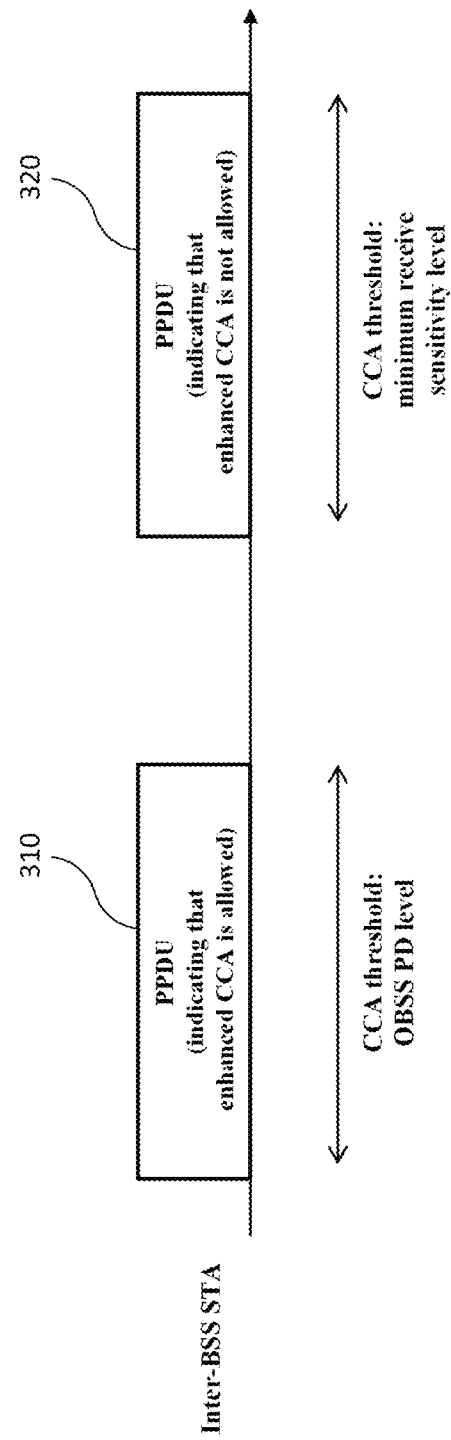
FIG. 7 illustrates a channel access method using a spatial reuse operation according to an embodiment of the present invention.

FIG. 7 illustrates a channel access method using a spatial reuse (SR) operation according to an embodiment of the present invention. Due to the spread of mobile devices and the spread of wireless communication systems, terminals are increasingly communicating in a dense environment. In particular, the number of cases where a terminal communicates in an environment in which a plurality of BSSs are overlapped is increasing. When a plurality of BSSs are overlapped, communication efficiency of the terminal may be degraded due to interference with other terminals. In particular, if a frequency band is used through a contention procedure, the terminal may not be able to secure even a transmission opportunity due to interference with other terminals. To solve this problem, the terminal may perform the SR operation.

More specifically, the terminal may determine whether a frame is an intra-BSS frame or an inter-BSS frame based on information for identifying a BSS of a received frame. The information for identifying a BSS includes at least one of a BSS color, a partial BSS color, a partial AID, or a MAC address. In the embodiment of the present invention, the non-legacy terminal may refer to a terminal that complies with the next generation wireless LAN standard (i.e., IEEE 802.11ax). Also, the intra-BSS frame indicates a frame transmitted from a terminal belonging to the same BSS, and the inter-BSS frame indicates a frame transmitted from a terminal belonging to an overlapping BSS (OBSS) or another BSS.

According to the embodiment of the present invention, the non-legacy terminal may perform different operations depending on whether the received frame is an intra-BSS frame. That is, when the received frame is determined as an intra-BSS frame, the terminal may perform the first operation. In addition, when the received frame is determined as an inter-BSS frame, the terminal may perform the second operation different from the first operation. According to an embodiment, the second operation performed by the terminal when the received frame is determined as an inter-BSS frame may be the SR operation. According to the embodiment of the present invention, the first operation and the second operation may be set in various ways.

According to an embodiment, the terminal may perform channel access based on different thresholds depending on whether the received frame is an intra-BSS frame. More specifically, when the received frame is determined as an intra-BSS frame, the terminal accesses the channel based on the first CCA threshold (i.e., the first operation). That is, the terminal performs a CCA based on the first CCA threshold value, and determines whether the channel is busy based on a result of performing the CCA. On the other hand, when the received frame is determined as an inter-BSS frame, the terminal may access the channel based on the second CCA threshold value (i.e., the second operation, or SR operation), which is distinct from the first CCA threshold value. That is, the terminal determines whether the channel is busy based on both the first CCA threshold value and the second CCA threshold value. According to the embodiment of the present invention, the second CCA threshold value is an OBSS PD level set for determining whether a channel is busy according to a received signal strength of an inter-BSS frame. In this case, the second CCA threshold value may have a value equal to or larger than the first CCA threshold value.

According to another embodiment of the present invention, the terminal may adjust a transmission power of a PHY protocol data unit (PPDU) transmitted by the terminal according to whether the received frame is an intra-BSS frame. More specifically, when the received frame is determined as an inter-BSS frame, the terminal may adjust the transmission power of the PPDU based on the SR parameter extracted from the received frame (i.e., the second operation, or SR operation). According to an embodiment, the terminal may increase the transmission power based on the SR parameter extracted from the received frame. According to the embodiment of the present invention, the non-legacy frame may contain an SR field for SR operation of OBSS terminals, and specific embodiments thereof will be described later. On the other hand, when the received frame is determined as an intra-BSS frame, the terminal does not perform the transmission power adjustment based on the SR parameter.

Referring to FIG. 7, the transmitted non-legacy frames 310 and 320 may contain information (i.e., information indicating whether the SR is allowed) indicating whether the SR operation for the corresponding PPDU is allowed. According to an embodiment, the information indicating whether the SR is allowed may be represented through a predetermined index of the SR field. For example, if the value of the SR field is 0 (i.e., if all bit values of the SR field are 0), it may indicate that the SR operation is not allowed. In the embodiment of FIG. 7, information, contained in the received first frame 310, indicating whether the SR is allowed indicates that the SR operation for the corresponding PPDU is allowed. In addition, information, contained in the received second frame 320, indicating whether the SR is allowed indicates that the SR operation for the corresponding PPDU is not allowed. In this case, it is assumed that both of the received first frame 310 and the received second frame 320 are inter-BSS frames.

The terminal receiving the first frame 310 determines whether the received frame 310 is an intra-BSS frame or an inter-BSS frame. In addition, the terminal checks information indicating whether the SR is allowed in the received frame 310. In this case, the received frame 310 is determined as an inter-BSS frame, and the information indicating whether the SR is allowed indicates that the SR operation for the corresponding PPDU is allowed. Accordingly, the terminal may perform the SR operations according to the above-described embodiments. That is, the terminal may determine whether the channel is busy based on both the first CCA threshold value and the second CCA threshold value. In addition, the terminal may adjust the transmission power based on the SR parameter extracted from the received frame 310.

Meanwhile, the terminal receiving the second frame 320 determines whether the received frame 320 is an intra-BSS frame or an inter-BSS frame. In addition, the terminal checks information indicating whether the SR is allowed in the received frame 320. In this case, the received frame 320 is determined as an inter-BSS frame, and the information indicating whether the SR is allowed indicates that the SR operation for the corresponding PPDU is not allowed. Therefore, the terminal does not perform the SR operations according to the above-described embodiment. That is, although the received frame 320 is determined as an inter-BSS frame, the terminal accesses the channel based on the first CCA threshold value. In addition, the terminal does not perform the transmission power adjustment based on the SR parameter extracted from the received frame 320.

According to a further embodiment of the present invention, the information indicating whether the SR is allowed may be transmitted through a frame of the legacy format. By containing the information indicating whether the SR is allowed in the frame of the legacy format, the AP can protect the transmitted legacy frame from SR operations of the non-legacy terminals. According to an embodiment, the information indicating whether the SR is allowed may be transmitted via an L-preamble. For example, reserved bit(s) of an L-SIG of the L-preamble may indicate whether the SR is allowed. Alternatively, guard sub-carrier(s) of the L-SIG of the L-preamble may carry the information indicating whether the SR is allowed.

According to another embodiment, the information indicating whether the SR is allowed may be transmitted via a VHT-preamble. For example, reserved bit(s) of a VHT-SIG-A1 or VHT-SIG-A2 of the VHT-preamble may indicate whether the SR is allowed. Alternatively, guard subcarrier(s) of the VHT-SIG-A1 or VHT-SIG-A2 of the VHT-preamble may carry the information indicating whether the SR is allowed.

According to yet another embodiment, the information indicating whether the SR is allowed may be transmitted via an HT-preamble. For example, reserved bit(s) of the HT-preamble may indicate whether the SR is allowed. Alternatively, guard sub-carrier(s) of the HT-preamble may carry the information indicating whether the SR is allowed. According to still another embodiment of the present invention, the information indicating whether the SR is allowed may be transmitted via a MAC header.

Figure 8:
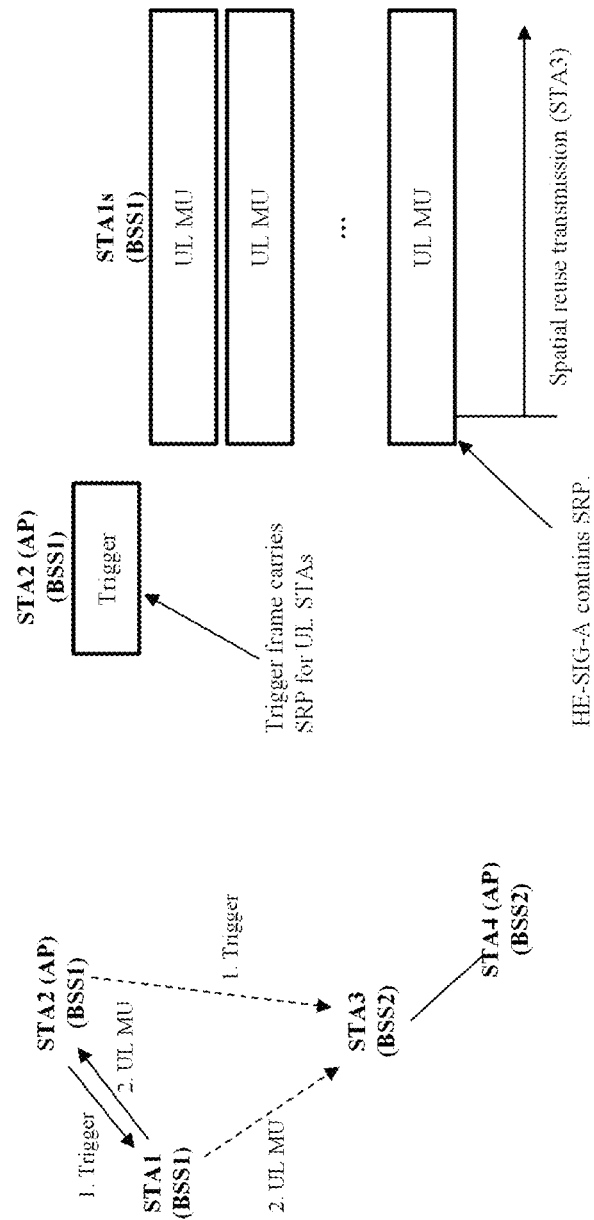
FIG. 8 illustrates an SR operation of a terminal according to the embodiment of the present invention when a PPDU containing a trigger frame is transmitted in an OBSS.

FIG. 8 illustrates an SR operation of a terminal according to the embodiment of the present invention when a PPDU containing a trigger frame is transmitted in an OBSS. In the embodiment of FIG. 8, BSS1 includes STA1 and STA2. In this case, STA1 is a non-AP STA and STA2 is an AP. Also, BSS2 includes STA3 and STA4. In this case, STA3 is a non-AP STA and STA4 is an AP. In the embodiment of FIG. 8, STA2 transmits a trigger frame (or a PPDU containing a trigger frame) to STA1, and STA1 transmits an uplink PPDU in response thereto. The uplink PPDU transmitted by STA1 transmits may be a trigger-based PPDU. Meanwhile, STA3 of BSS2 intends to transmit a PPDU to STA4. Prior to transmission of the PPDU, STA3 may receive the trigger frame transmitted by the STA2 and/or the trigger-based PPDU transmitted by the STA1. In this case, STA3 may obtain an SR parameter from at least one of the trigger frame and the corresponding trigger-based PPDU.

According to the embodiment of the present invention, an AP may signal information of at least one of an acceptable interference level of the AP and a transmission power of a PPDU containing a trigger frame when transmitting the trigger frame. More specifically, the AP may carry an SR parameter (hereinafter, SRP) through a trigger frame. According to the embodiment of the present invention, the SRP may be set as follows.

$$SRP = TXPWR\_AP + \text{Acceptable Receiver Interference Level}\_AP \quad \text{[Equation 1]}$$

Herein, 'TXPWR_AP' denotes the transmission power of the PPDU containing the trigger frame. In addition, 'Acceptable Receiver Interference Level_AP' denotes the level of interference that an AP transmitting the trigger frame can tolerate, that is, an acceptable interference level. The acceptable interference level may indicate the level of interference that the AP can tolerate when a trigger-based PPDU in response to the trigger frame transmitted by the AP is received. As such, the SRP may be determined based on the transmission power of the PPDU containing the trigger frame and the acceptable interference level. More specifically, the SRP may be set to the sum of the transmission power of the PPDU containing the trigger frame and the acceptable interference level.

According to the embodiment of the present invention, the AP may transmit the SRP determined by Equation 1 by inserting it into the trigger frame. According to an embodiment, the SRP may be contained in a common information field of the trigger frame. The STA receiving the trigger frame from the AP transmits a multi-user uplink frame, that is, a trigger-based PPDU in response thereto. In this case, the STA may carry the SRP information obtained from the trigger frame through a predetermined field of the trigger-based PPDU. According to an embodiment, the SRP information may be contained in the SR field of HE-SIG-A of the trigger-based PPDU.

Meanwhile, the terminal receiving the trigger frame transmitted from the OBSS may perform the SR operation based on the obtained SRP. In this case, the SRP may be obtained from at least one of the trigger frame and the corresponding trigger-based PPDU. According to an embodiment, the terminal may adjust the transmission power of the PPDU based on the SRP as follows.

$$TXPWR\_STA < SRP - RSSI\_TriggerFrame\_at\_STA \quad \text{[Equation 2]}$$

Herein, 'TXPWR_STA' denotes the transmission power of the PPDU to be transmitted by the terminal. Also, 'RSSI_TriggerFrame_at_STA' denotes the received signal strength of the PPDU containing the trigger frame measured by the terminal. That is, the transmission power of the terminal is set to be lower than the value obtained by subtracting the received signal strength of the PPDU containing the trigger frame from the obtained SRP value. According to the embodiment of the present invention, the terminal may transmit the PPDU with the transmission power 'TXPWR_STA' set according to Equation 2. Alternatively, the terminal may transmit the PPDU only when the intended transmission power 'TXPWR_STA' of the terminal is less than the value obtained by subtracting the received signal strength of the PPDU containing the trigger frame from the obtained SRP value, as in Equation 2.

According to the embodiment of FIG. 8, the STA2 transmits the SRP by inserting it into the trigger frame. In addition, STA1 transmits the trigger-based PPDU in response to the received trigger frame. In this case, STA1 may insert the SRP into a predetermined field of the trigger-based PPDU. STA3 measures the received signal strength of the PPDU containing the trigger frame transmitted by the STA2. In addition, STA3 may obtain the SRP from at least one of the trigger frame transmitted by the STA2 and the trigger-based PPDU transmitted by the STA1. According to the embodiment the present invention, when the transmission power value of a PPDU to be transmitted to STA4 by STA3 is lower than the transmission power determined by the Equation 2, STA3 may transmit the PPDU to STA4.

The magnitudes of the transmission power and the interference may be values normalized to the 20 MHz frequency bandwidth. For example, TXPWR=power−10*log(BW/20 MHz). In this case, BW denotes the total transmission bandwidth. Thus, the SRP may be a normalized value in the 20 MHz frequency bandwidth. Accordingly, the terminal may scale the transmission power value of the PPDU to be transmitted according to the frequency bandwidth used by the PPDU to be transmitted to apply the above-described equation.

When a terminal receives a radio signal, the terminal may separately process the received signal in a physical layer and a MAC layer. In this case, the interface between the physical layer and the MAC layer is referred to as a primitive. In addition, the operation of the physical layer of the terminal can be performed by a PHY layer management entity (PLME). In addition, the operation of the MAC layer of the terminal can be performed by a MAC layer management entity (MLME). In this case, for the above-described embodiments, the RXVECTOR of the primitive may contain at least one of SRP (or SR field value), transmission opportunity (TXOP) duration, or a BSS color.

Figure 9:
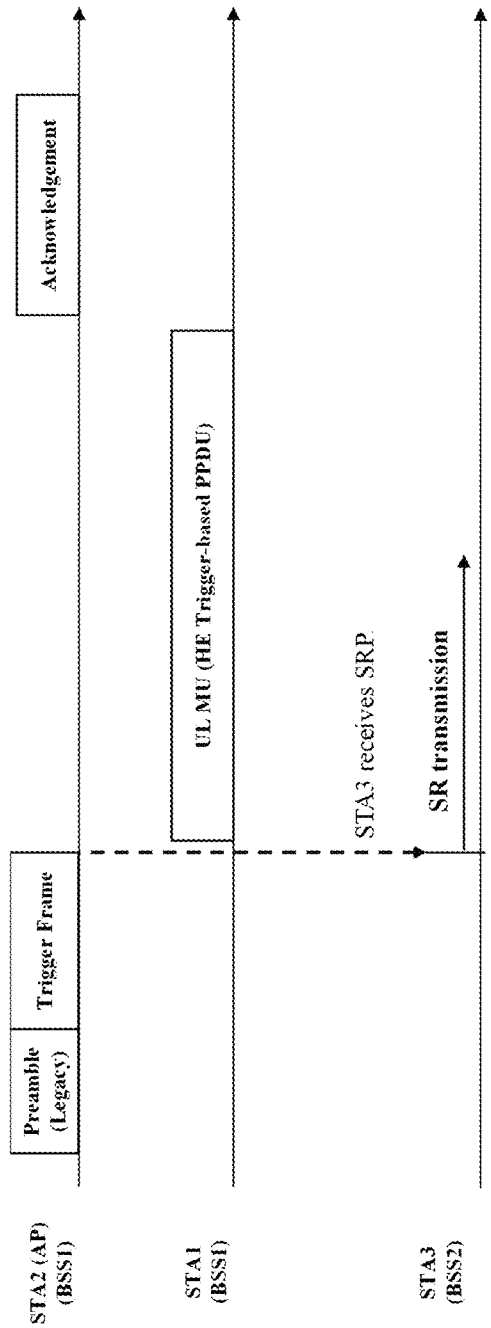
FIG. 9 illustrates an SR operation of a terminal according to the embodiment of the present invention in more detail when a PPDU containing a trigger frame is transmitted in an OBSS.

FIG. 9 illustrates an SR operation of a terminal according to the embodiment of the present invention in more detail when a PPDU containing a trigger frame is transmitted in an OBSS. As described with reference to FIG. 8, the terminal may transmit a PPDU according to the SR operation based on the received signal strength of the PPDU containing the trigger frame transmitted from the OBSS and the value of the obtained SRP. Specifically, the terminal may transmit the PPDU by adjusting the transmission power based on the received signal strength of the PPDU containing the trigger frame transmitted from the OBSS and the value of the SRP indicated by the trigger frame and/or the trigger-based PPDU.

More specifically, the terminal may adjust the transmission power of the PPDU to be transmitted to satisfy Equation 2 as described above. In this case, the terminal may access the channel and transmit the PPDU by adjusting the transmission power at the time of obtaining the SRP value. According to another embodiment, the terminal may start transmission of the PPDU by adjusting the transmission power at the end of the transmission of the PPDU containing the trigger frame transmitted from the OBSS. However, when the PPDU containing the trigger frame is a legacy PPDU, the terminal may decode the MAC frame of the corresponding PPDU to determine whether the PPDU contains the trigger frame. Also, if the BSS indicated by the signaling field of the PPDU is different from the BSS indicated by the address field of the MAC header, the terminal may decode the MAC frame of the corresponding PPDU. At this time, the terminal may obtain the SRP value from the trigger frame.

In the embodiment of FIG. 9, it is illustrated that the terminal transmits the PPDU by adjusting the transmission power at the end of the transmission of the PPDU containing the trigger frame transmitted from the OBSS. According to another specific embodiment, when the PPDU containing the trigger frame is a legacy PPDU, the terminal may transmit the PPDU by adjusting the transmission power at the time when the terminal checks that the PPDU is the trigger frame transmitted from the OBSS. In these embodiments, the terminal may transmit the PPDU based on the SR operation at a time point earlier than the embodiment described with reference to FIG. 8.

Figure 10:
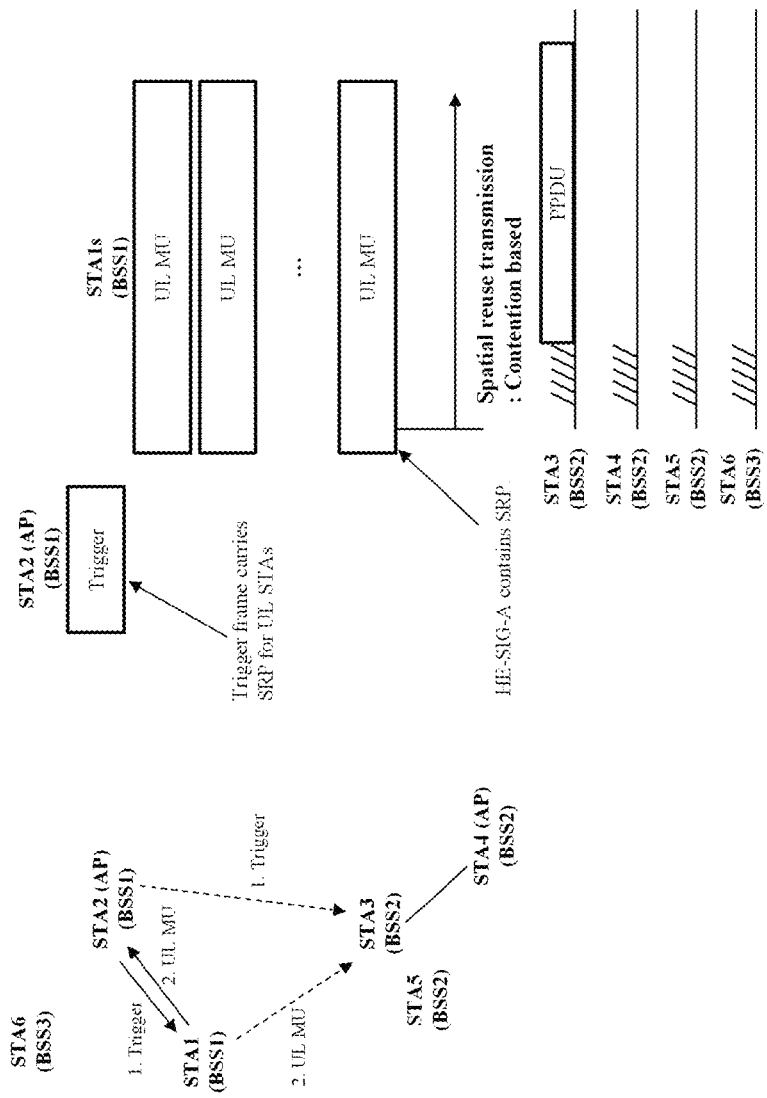
FIG. 10 illustrates the embodiment in which a terminal performs an SR operation based on a contention procedure when a PPDU containing a trigger frame is transmitted in an OBSS.

FIG. 10 illustrates the embodiment in which a terminal performs an SR operation based on a contention procedure when a PPDU containing a trigger frame is transmitted in an OBSS. As described above, during the transmission procedure of the trigger frame and the corresponding trigger-based PPDU in the OBSS, the terminal can transmit a PPDU based on the SR operation. Specifically, the terminal may transmit the PPDU according to the condition of Equation 2. That is, the terminal may transmit the PPDU by adjusting the transmission power according to Equation 2.

Meanwhile, one or more terminals may transmit a PPDU based on the SR operation during the transmission procedures in the OBSS. However, when a plurality of terminals transmit PPDUs based on the SR operation, a collision may occur between transmissions of different terminals. Further, when a plurality of terminals transmit PPDUs, interference exceeding the magnitude of interference that can be tolerated by the OBSS access point may occur.

In the embodiment of FIG. 10, BSS1 includes STA1 and STA2. In this case, STA1 is a non-AP STA and STA2 is an AP. Also, BSS2 includes STA3, STA4, and STA5. In this case, STA3 is a non-AP STA, STA4 is an AP, and STA5 is a non-AP STA. In addition, BSS3 includes STA6, and STA6 is a non-AP STA. In the embodiment of FIG. 10, STA2 transmits a trigger frame (or PPDU containing a trigger frame) to STA1, and STA1 transmits an uplink PPDU in response thereto. The uplink PPDU transmitted by STA1 may be a trigger-based PPDU.

In the embodiment of FIG. 10, when at least two of STA3 to STA6 transmit PPDUs at the same time, a collision may occur. In addition, when at least two of STA3 to STA6 transmit PPDUs at the same time, interference exceeding the magnitude of interference that can be tolerated by STA2 may occur. Accordingly, STA2 may not receive the PPDU from STA1. In order to solve this problem, when the PPDU transmission is performed based on the SR operation, the terminal may access the channel by performing a backoff procedure.

Referring to FIG. 10, if the PPDU is transmitted based on the SR operation, the terminal may perform the backoff procedure described above. In this case, the terminal may use the backoff counter used when accessing the channel through the DCF and the EDCAF as the backoff counter value of the corresponding backoff procedure. According to an embodiment of the present invention, in order to determine whether the channel is idle in the backoff procedure, the terminal may use energy detect (ED). According to another embodiment of the present invention, the terminal may determine whether the channel is idle according to whether a PPDU having a signal strength higher than a threshold value is received. In this case, the threshold value may be a value larger than the existing minimum receive sensitivity. For example, the terminal may determine whether the channel is idle based on the above-described OBSS PD level. According to the embodiment of the present invention, the OBSS PD level used by the terminal in the SR operation may be set to a large value without any limitation. For example, the OBSS PD level used in the SR operation may be set to a predetermined value below the infinite value. During the transmission of the trigger-based PPDU of the OBSS, the terminal may perform the SR operation using the set OBSS PD level.

Figure 11:
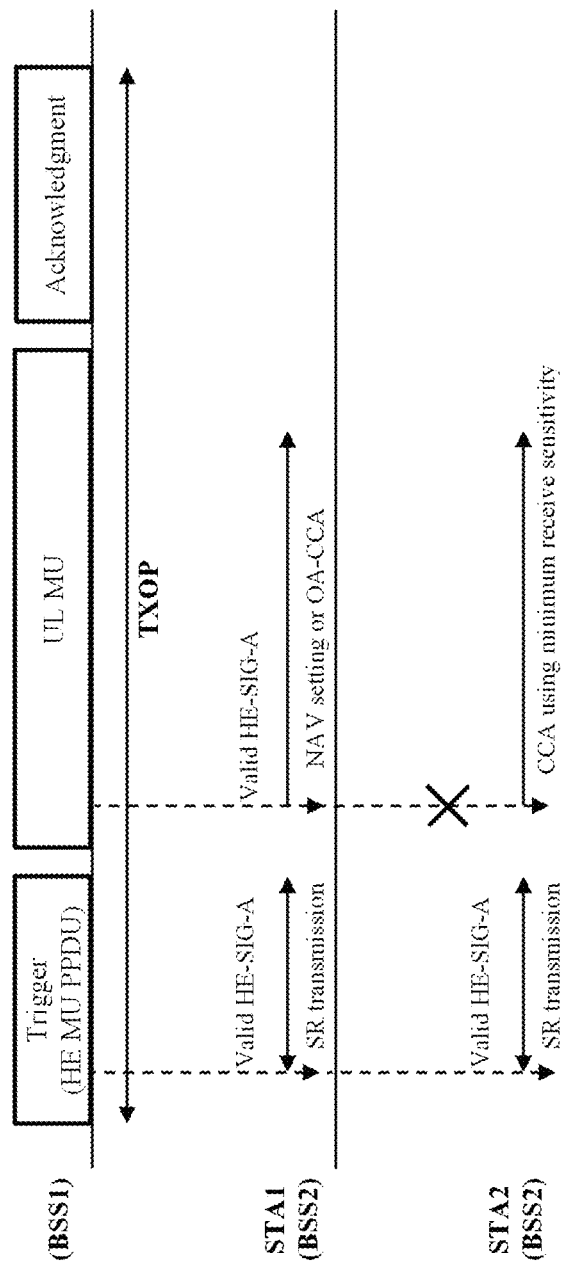
FIG. 11 illustrates an embodiment of an operation in which a terminal sets a NAV when a PPDU containing a trigger frame is transmitted in an OBSS.

FIG. 11 illustrates an embodiment of an operation in which a terminal sets a NAV when a PPDU containing a trigger frame is transmitted in an OBSS. If the PPDU containing the trigger frame is transmitted in the OBSS and the terminal can transmit a PPDU based on the SR operation, the terminal may not set a NAV according to the trigger frame (or the PPDU containing the trigger frame). In addition, if the terminal fails to receive the PPDU containing the trigger frame transmitted from the OBSS, the terminal cannot set the NAV according to the trigger frame.

When the terminal receives the trigger-based PPDU transmitted from the OBSS, the terminal can transmit the PPDU based on the SR operation as in the above-described embodiments. However, if the conditions for transmitting the PPDU based on the SR operation are not satisfied, the terminal may set a NAV based on the signaling field of the trigger-based PPDU. In this case, the signaling field may be a TXOP duration field of the HE-SIG-A field. If the conditions for transmitting the PPDU based on the SR operation are not satisfied, the terminal may perform a CCA by using a value less than or equal to the first CCA threshold rather than the above-set OBSS PD level (i.e., the second CCA threshold) during the transmission of the trigger-based PPDU in the OBSS. This is because the PPDU transmission based on the SR operation of the terminal can give interference more than the magnitude of the interference that can be tolerated by the AP of the OBSS that will receive the trigger-based PPDU. Meanwhile, in the embodiment of FIG. 11, STA2 receives the legacy preamble of the trigger-based PPDU transmitted in the OBSS, but may not receive the non-legacy signaling field. In this case, the STA2 may perform the CCA based on the minimum receive sensitivity.

According to a further embodiment of the present invention, if the information for determining whether the condition for transmitting a PPDU based on the SR operation is satisfied is not sufficient, the terminal may not perform the PPDU transmission based on the SR operation. In this case, the terminal may perform the CCA by using the first CCA threshold rather than the OBSS PD level (i.e., the second CCA threshold) during the transmission of the trigger-based PPDU in the OBSS. In this case, the case that the information for determining whether the condition for transmitting a PPDU based on the SR operation is satisfied is not sufficient includes a case that the terminal fails to receive the trigger frame.

Figure 12:
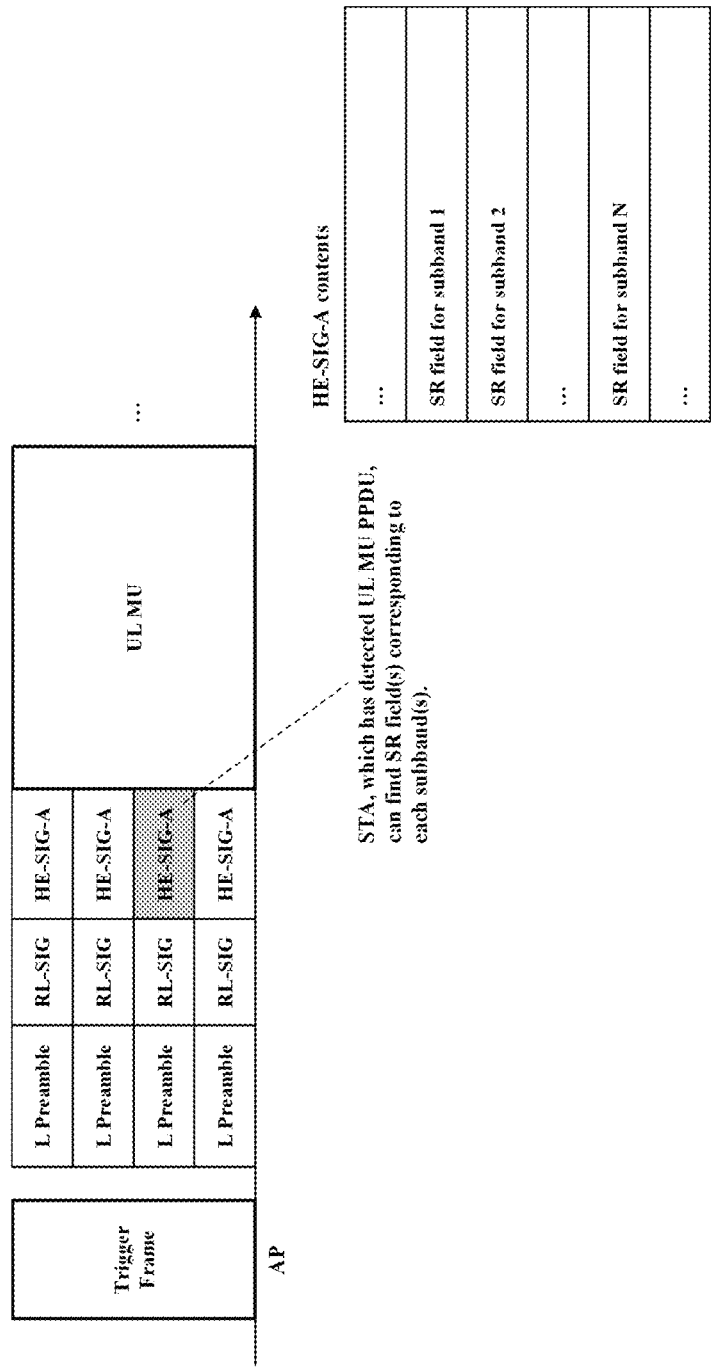
FIG. 12 illustrates the embodiment of transmitting a spatial reuse parameter via a trigger frame and a corresponding trigger-based PPDU.

FIG. 12 illustrates the embodiment of transmitting a spatial reuse parameter via a trigger frame and a corresponding trigger-based PPDU. In the embodiment of FIG. 12, the AP transmits a trigger frame (or a PPDU containing a trigger frame), and the receiving STAs transmit a trigger-based PPDU.

As described above, the AP may transmit the SRP determined by Equation 1 by inserting it into the trigger frame. According to an embodiment, the SRP may be contained in the common information field of the trigger frame. The STA receiving the trigger frame from the AP transmits a trigger-based PPDU in response thereto. In this case, the STA may carry the SRP information obtained from the trigger frame through a predetermined field of the trigger-based PPDU. According to an embodiment, the SRP information may be contained in the SR field of HE-SIG-A of the trigger-based PPDU. That is, the SR field of the trigger-based PPDU may carry the SRP obtained from the trigger frame.

According to the embodiment of the present invention, the HE-SIG-A of the trigger-based PPDU may contain a plurality of SR fields. The plurality of SR fields carry the SRP obtained from the trigger frame. In this case, each of the plurality of SR fields indicates an SRP for an individual subband constituting the total bandwidth on which the trigger-based PPDU(s) are transmitted. The total bandwidth on which the trigger-based PPDU(s) are transmitted may be indicated by a bandwidth field of the HE-SIG-A of the trigger-based PPDU. Referring to FIG. 12, HE-SIG-A of the trigger-based PPDU may contain N SR fields. Each of the N SR fields may indicate an SRP for an individual subband in units of 20 MHz or 40 MHz. According to the embodiment of the present invention, N may be set to 4. That is, the plurality of SR fields may include a first SR field, a second SR field, a third SR field, and a fourth SR field. However, the present invention is not limited thereto. According to an embodiment, the plurality of SR fields may indicate SRPs for different subbands, respectively. However, according to the embodiment of the present invention, under certain conditions, at least some of the plurality of SR fields may be set to have the same value. A specific embodiment will be described later.

HE-SIG-A of the PPDU in an HE format signals the same information in units of 20 MHz bandwidth. That is, the plurality of SR fields of the HE-SIG-A may be duplicated in units of 20 MHz bandwidth, and may be carried through the total bandwidth in which the trigger-based PPDU is transmitted. Therefore, the terminal receiving the trigger-based PPDU can detect N SR fields corresponding to each subband.

The physical band on which the trigger-based PPDU is transmitted may be identified through various information or a combination thereof. According to an embodiment, the physical band on which the trigger-based PPDU is transmitted may be identified based on bandwidth field information and operating class information. The bandwidth field of the HE-SIG-A of the trigger-based PPDU indicates the total bandwidth on which the trigger-based PPDU(s) are transmitted. In addition, the operating class information may include information on which band a particular band can combine with to configure a wideband channel. Accordingly, the terminal receiving the trigger-based PPDU may identify the order of the subband, in which the corresponding PPDU is received, among the total bandwidth based on the bandwidth field information and the operating class information extracted from the received PPDU. In addition, the terminal receiving the trigger-based PPDU may identify the SR field for the band in which the corresponding PPDU is received among the plurality of SR fields based on the bandwidth field information and the operating class information. Meanwhile, although a method of identifying the physical band on which the trigger-based PPDU is transmitted has been described above, the physical band on which the PPDU in an HE format is transmitted can also be identified in the same manner.

According to another embodiment of the present invention, the PPDU in an HE format may separately signal the physical band information on which the corresponding PPDU is transmitted. For example, the HE-SIG-A of the HE PPDU may contain physical band information on which the PPDU is transmitted. More specifically, the HE-SIG-A may indicate one or more frequency information indicating the physical band information on which the corresponding PPDU is transmitted. For example, the HE-SIG-A may indicate the start frequency index of the band on which the PPDU is transmitted. In addition, when the total bandwidth on which the PPDU is transmitted is 80+80 MHz or 160 MHz, the HE-SIG-A may indicate at least two frequency indices. According to yet another embodiment of the present invention, the PPDU in an HE format may signal center frequency information of the physical band on which the corresponding PPDU is transmitted. In addition, when the total bandwidth on which the PPDU is transmitted is 80+80 MHz or 160 MHz, at least two center frequency information for the physical band on which the PPDU is transmitted may be signaled.

According to an embodiment of the present invention, the trigger-based PPDU may signal channel information corresponding to each of the plurality of SR fields of the HE-SIG-A. In this case, the channel information includes information on at least one of a channel number, a frequency of the channel, and a center frequency of the channel. The channel information to be signaled may be sequentially matched to the plurality of SR fields. If the total bandwidth on which the trigger-based PPDU(s) are transmitted is 80+80 MHz or 160 MHz, the total bandwidth may be divided into a first frequency band and a second frequency band in units of 80 MHz. According to an embodiment of the present invention, the trigger-based PPDU may signal channel information corresponding to SR fields for the first frequency band and the second frequency band, respectively. According to another embodiment, the trigger-based PPDU may signal channel information corresponding to SR fields for either the first frequency band or the second frequency band. In this case, only the channel information corresponding to the SR fields for either the first frequency band or the second frequency band may be explicitly indicated. The terminal receiving the trigger-based PPDU may identify the SR field for the band on which the PPDU is received among the plurality of SR fields according to whether the band on which the corresponding PPDU is received is the band in which the channel information is explicitly indicated.

According to an embodiment of the present invention, the SR field may be adjusted according to the total bandwidth on which the trigger-based PPDU(s) are transmitted. According to an embodiment, when the total bandwidth indicated by the bandwidth field exceeds a predetermined bandwidth, the number of the plurality of SR fields contained in the HE-SIG-A may be increased. According to another embodiment, when the total bandwidth indicated by the bandwidth field exceeds the predetermined bandwidth, the frequency bandwidth corresponding to each SR field may be increased. More specifically, when the total bandwidth indicated by the bandwidth field is less than or equal to the predetermined bandwidth, the SR field may indicate an SRP for a subband of a first frequency bandwidth. However, when the total bandwidth indicated by the bandwidth field exceeds the predetermined bandwidth, the SR field may indicate an SRP for a subband of a second frequency bandwidth that is wider than the first frequency bandwidth. For example, when the total bandwidth indicated by the bandwidth field is 20 MHz, 40 MHz, or 80 MHz, then the SR field may indicate an SRP for a subband of 20 MHz bandwidth. However, when the total bandwidth indicated by the bandwidth field is 80+80 MHz or 160 MHz, then the SR field may indicate an SRP for a subband of 40 MHz bandwidth.

FIG. 13 illustrates a method for signaling spatial reuse fields of a trigger-based PPDU according to the embodiment of the present invention. Referring to FIG. 13, HE-SIG-A of the trigger-based PPDU may contain a plurality of SR fields. According to the embodiment of the present invention, the HE-SIG-A of the trigger-based PPDU may contain four SR fields. That is, HE-SIG-A contains a first SR field, a second SR field, a third SR field, and a fourth SR field. Also, each SR field may consist of 4 bits. Each of the SR fields may indicate an SRP for an individual subband in units of 20 MHz or 40 MHz.

First, when the total bandwidth on which the trigger-based PPDU(s) are transmitted is 20 MHz, the first SR field indicates an SRP for the corresponding 20 MHz band. In addition, the second SR field, the third SR field, and the fourth SR field are set to the same value as the first SR field.

Next, when the total bandwidth on which the trigger-based PPDU(s) are transmitted is 40 MHz, the first SR field indicates an SRP for the first 20 MHz band and the second SR field indicates an SRP for the second 20 MHz band. In addition, the third SR field is set to the same value as the first SR field, and the fourth SR field is set to the same value as the second SR field. In this case, the first 20 MHz band and the second 20 MHz band constitute the total bandwidth of 40 MHz on which the trigger-based PPDU(s) are transmitted.

Next, when the total bandwidth on which the trigger-based PPDU(s) are transmitted is 80 MHz, the first SR field indicates an SRP for the first 20 MHz band, the second SR field indicates an SRP for the second 20 MHz band, the third SR field indicates an SRP for the third 20 MHz band, and the fourth SR field indicates an SRP for the fourth 20 MHz band. In this case, the first 20 MHz band to the fourth 20 MHz band constitute the total bandwidth of 80 MHz on which the trigger-based PPDU(s) are transmitted.

Meanwhile, when the total bandwidth on which the trigger-based PPDU(s) are transmitted is 160 MHz, the first SR field indicates an SRP for the first 40 MHz band, the second SR field indicates an SRP for the second 40 MHz band, the third SR field indicates an SRP for the third 40 MHz band, and the fourth SR field indicates an SRP for the fourth 40 MHz band. In this case, the first 40 MHz band to the fourth 40 MHz band constitute the total bandwidth 160 MHz on which the trigger-based PPDU(s) are transmitted.

According to the embodiment of the present invention, the plurality of SR fields may indicate SRPs for a plurality of subbands in physical frequency order.

According to an embodiment, the plurality of SR fields may indicate SRPs for a plurality of subbands in ascending order of the physical frequency. That is, the first SR field may indicate an SRP for the lowest frequency subband, and the fourth SR field may indicate an SRP for the highest frequency subband. According to another embodiment, the plurality of SR fields may indicate SRPs for a plurality of subbands in descending order of the physical frequency. That is, the first SR field may indicate an SRP for the highest frequency subband, and the fourth SR field may indicate an SRP for the lowest frequency subband.

FIG. 14 illustrates an embodiment of a method for setting spatial reuse fields of a trigger-based PPDU. As described above, when the total bandwidth on which the trigger-based PPDU(s) are transmitted is 160 MHz (or 80+80 MHz), each SR field of the trigger-based PPDU may indicate an SRP for an individual subband in units of 40 MHz. Therefore, a method for setting SRPs for individual subbands in units of 40 MHz is needed.

According to the embodiment of FIG. 14, the SR field x for the x-th 40 MHz band may be determined by reflecting an SRP for the 20 MHz channel xa and an SRP for the 20 MHz channel xb (where x=1, 2, 3 or 4). If the SR field indicates an SRP for a subband in units of 40 MHz, the resolution of information for the individual subbands is reduced. For example, if the SR field x is determined by normalizing the SRP for channel xa and the SRP for channel xb, and the situation of channel xa and channel xb is different, then an interference which exceeds the acceptable interference level may occur at a channel in a bad condition among the two channels. Therefore, according to the embodiment of the present invention, the SR field for the 40 MHz band may be determined based on a conservative value among the SRPs for the 20 MHz subbands constituting the corresponding band.

According to an embodiment of the present invention, the SR field x for the x-th 40 MHz band may be determined as shown in Equation 3.

$$SRP\_x = 2 * \min(SRP\_xa, SRP\_xb) \text{ where} \qquad \text{[Equation 3]}$$

$$SRP\_xa = TXPWR\_AP, xa + \text{Acceptable Receiver Interference Level\_AP}, xa$$

$$SRP\_xb = TXPWR\_AP, xb + \text{Acceptable Receiver Interference Level\_AP}, xb$$

Herein, 'SRP_x' denotes the value of the SR field x, that is, the x-th SRP. Also, 'SRP_xa' and 'SRP_xb' denote SRPs for the first 20 MHz band and the second 20 MHz band, respectively, constituting the x-th 40 MHz band. 'SRP_xa' may be set to the sum of the transmission power 'TX PWR_AP, xa' of the PPDU containing the trigger frame on channel xa and the acceptable interference level 'Acceptable Receiver Interference Level_AP, xa' in channel xa. Also, 'SRP_xb' may be set to the sum of the transmission power 'TX PWR_AP, xb' of the PPDU containing the trigger frame on channel xb and the acceptable interference level 'Acceptable Receiver Interference Level_AP, xb' in channel xb. That is, according to the embodiment of Equation 3, the SR field x may be set to twice the minimum value of 'SRP_xa' and 'SRP_xb' for the respective 20 MHz band.

According to another embodiment of the present invention, the SR field x for the x-th 40 MHz band may be determined as shown in Equation 4.

$$SRP\_x = TX\ PWR\_AP, x + Acceptable\ Receiver\ Interference\ Level\_AP, x \quad \text{[Equation 4]}$$

where

TX PWR_AP, x=2*min(TX PWR_AP, xa, TX PWR_AP, xb)

Acceptable Receiver Interference Level_AP, x=2*min (Acceptable Receiver Interference Level_AP, xa, Acceptable Receiver Interference Level_AP, xb)

Referring to Equation 4, 'SRP_x' may be set to the sum of the transmission power 'TX PWR_AP, x' of the PPDU containing the trigger frame in channel x and the tolerable interference level 'Acceptable Receiver Interference Level_AP, x'. In this case, 'TX PWR_AP, x' may be set to twice the minimum value of 'TX PWR_AP_xa' and 'TX_P-WR_AP_xb'. In addition, 'Acceptable Receiver Interference Level_AP, x' may be set to twice the minimum value of 'Acceptable Receiver Interference Level_AP, xa' and 'Acceptable Receiver Interference Level_AP, xb'. The definition of each variable in Equation 4 is as described in Equation 3.

According to yet another embodiment of the present invention, the SR field x for the x-th 40 MHz band may be determined as shown in Equation 5.

$$SRP\_x = \min(SRP\_xa, SRP\_xb) \text{ where} \quad \text{[Equation 5]}$$

$$SRP\_xa = TXPWR\_AP, xa + Acceptable\ Receiver\ Interference\ Level\_AP, xa$$

$$SRP\_xb = TXPWR\_AP, xb + Acceptable\ Receiver\ Interference\ Level\_AP, xb$$

Referring to Equation 5, 'SRP_x' may be set to a minimum value among 'SRP_xa' and 'SRP_xb'. The calculation method of 'SRP_xa' and 'SRP_xb' and the definition of each variable are as described in Equation 3. According to the embodiment of Equation 5, without performing an operation of multiplying SRP for the 20 MHz band by 2, the terminal can recognize in advance that 'SRP_x' corresponds to the 20 MHz band.

According to still another embodiment of the present invention, the SR field x for the x-th 40 MHz band may be determined as shown in Equation 6.

$$SRP\_x = TX\ PWR\_AP, x + Acceptable\ Receiver\ Interference\ Level\_AP, x \quad \text{[Equation 6]}$$

where

TX PWR_AP, x=min(TX PWR_AP, xa, TX PWR_AP, xb)

Acceptable Receiver Interference Level_AP, x=min(Acceptable Receiver Interference Level_AP, xa, Acceptable Receiver Interference Level_AP, xb)

Referring to Equation 6, 'SRP_x' may be set to the sum of 'TX PWR_AP, x' and 'Acceptable Receiver Interference Level_AP, x'. In this case, 'TX PWR_AP, x' may be set to a minimum value among 'TX PWR_AP_xa' and 'TX_P-WR_AP_xb'. In addition, 'Acceptable Receiver Interference Level_AP, x' may be set to a minimum value among 'Acceptable Receiver Interference Level_AP, xa' and 'Acceptable Receiver Interference Level_AP, xb'. The definition of each variable in Equation 6 is as described in Equation 3. According to the embodiment of Equation 6, the terminal can recognize in advance that 'SRP_x' corresponds to the 20 MHz band.

FIGS. 15 to 19 illustrate methods for configuring an HE-SIG-A and spatial reuse fields according to the embodiment of the present invention. In each of the embodiments shown in FIGS. 15 to 19, duplicative description of parts which are the same as or correspond to the embodiments of the previous drawings will be omitted.

As described above, the HE-SIG-A of the trigger-based PPDU may contain four SR fields. When the total bandwidth on which the trigger-based PPDU(s) are transmitted is 160 MHz (or 80+80 MHz), each of the SR fields may indicate an SRP for an individual subband in units of 40 MHz. In this case, the trigger-based PPDU may be transmitted on at least one of the primary 80 MHz channel (hereinafter, P80 channel) and the secondary 80 MHz channel (hereinafter, S80 channel). However, an OBSS terminal receiving the trigger-based PPDU cannot know the frequency band configuration of the BSS in which the corresponding PPDU is transmitted. More specifically, when the total bandwidth on which the trigger-based PPDU(s) are transmitted is 80+80 MHz, the OBSS terminal may not be able to identify the physical band of the P80 channel and the S80 channel constituting the total bandwidth. Therefore, the OBSS terminal receiving the PPDU cannot identify which frequency band the SR fields of the corresponding PPDU are for. Also, the OBSS terminal cannot identify which SR field among the SR fields is for the subband on which the corresponding PPDU is received. Therefore, there is a need for a method for resolving the ambiguity of the SR field identification of the OBSS terminals receiving the trigger-based PPDU.

Figure 15:
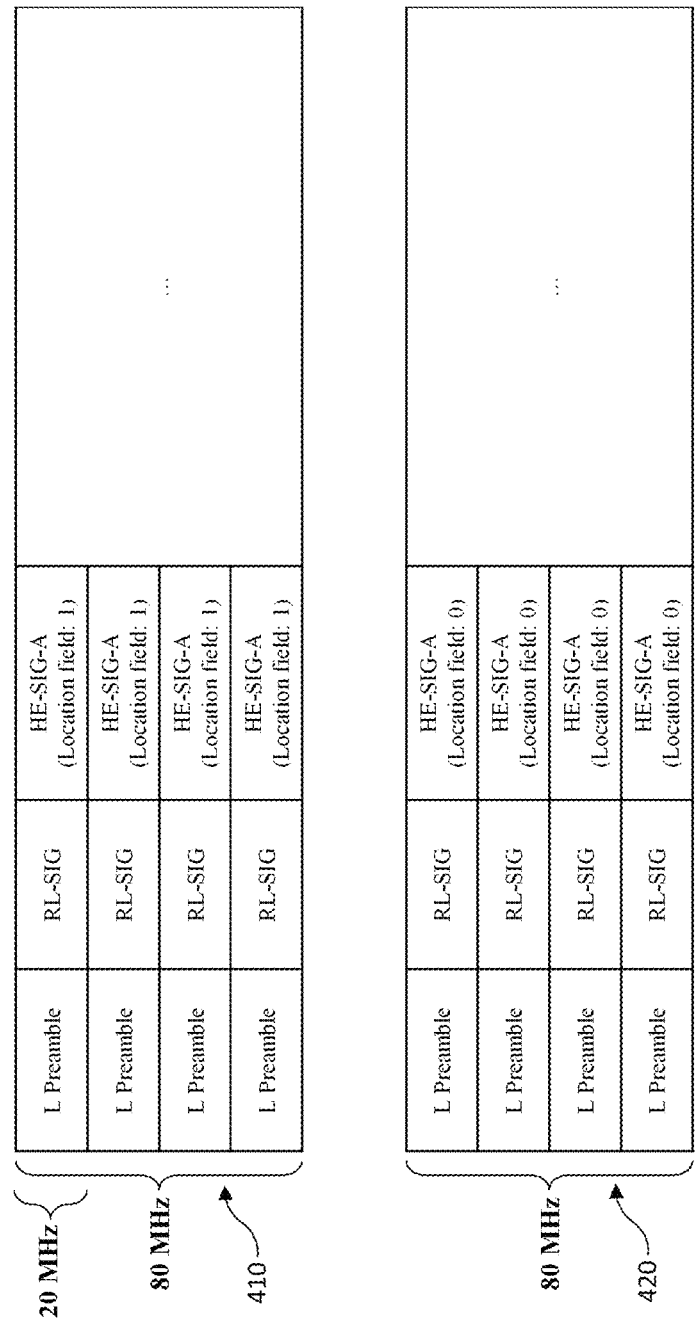
FIGS. 15 to 19 illustrate methods for configuring an HE-SIG-A and spatial reuse fields according to the embodiment of the present invention.

FIG. 15 illustrates a method for configuring an HE-SIG-A and spatial reuse fields of the trigger-based PPDU according to an embodiment of the present invention.

According to the embodiment of FIG. 15, the HE-SIG-A of a PPDU in an HE format may contain a location field. The location field may indicate either the first frequency band or the second frequency band constituting the total bandwidth. For example, when the total bandwidth on which the trigger-based PPDUs 410 and 420 are transmitted is 80+80 MHz, then the location field of the HE-SIG-A may indicate either the first 80 MHz frequency band or the second 80 MHz frequency band. According to the embodiment of the present invention, the first SR field and the second SR field of the HE-SIG-A may indicate an SRP for the first frequency band, and the third SR field and the fourth SR field of the HE-SIG-A may indicate an SRP for the second frequency band.

The first frequency band and the second frequency band can be classified by various methods. According to an embodiment, the first frequency band may be a low frequency band and the second frequency band may be a high frequency band. According to another embodiment, the first frequency band may be a high frequency band and the second frequency band may be a low frequency band. According to yet another embodiment, the first frequency band may be a band of the P80 channel and the second frequency band may be a band of the S80 channel. In the embodiment of FIG. 15, the trigger-based PPDU 410 transmitted on the first frequency band may set the location field to 1 (or 0) and the trigger-based PPDU 420 transmitted on the second frequency band may set the location field to 0 (or 1). In the embodiments of the present invention, the first frequency band and the second frequency band indicate different 80 MHz bands, but the present invention is not limited thereto.

An OBSS terminal receiving the trigger-based PPDUs 410, 420 may identify an SRP for the subband on which the corresponding PPDUs 410, 420 is received based on the location field information of the received PPDUs 410, 420. If the location field information indicates the first frequency band, the OBSS terminal may obtain the SRP for the corresponding subband from at least one of the first SR field and the second SR field. However, if the location field information indicates the second frequency band, the OBSS terminal may obtain the SRP for the corresponding subband from at least one of the third SR field and the fourth SR field.

Figure 16:
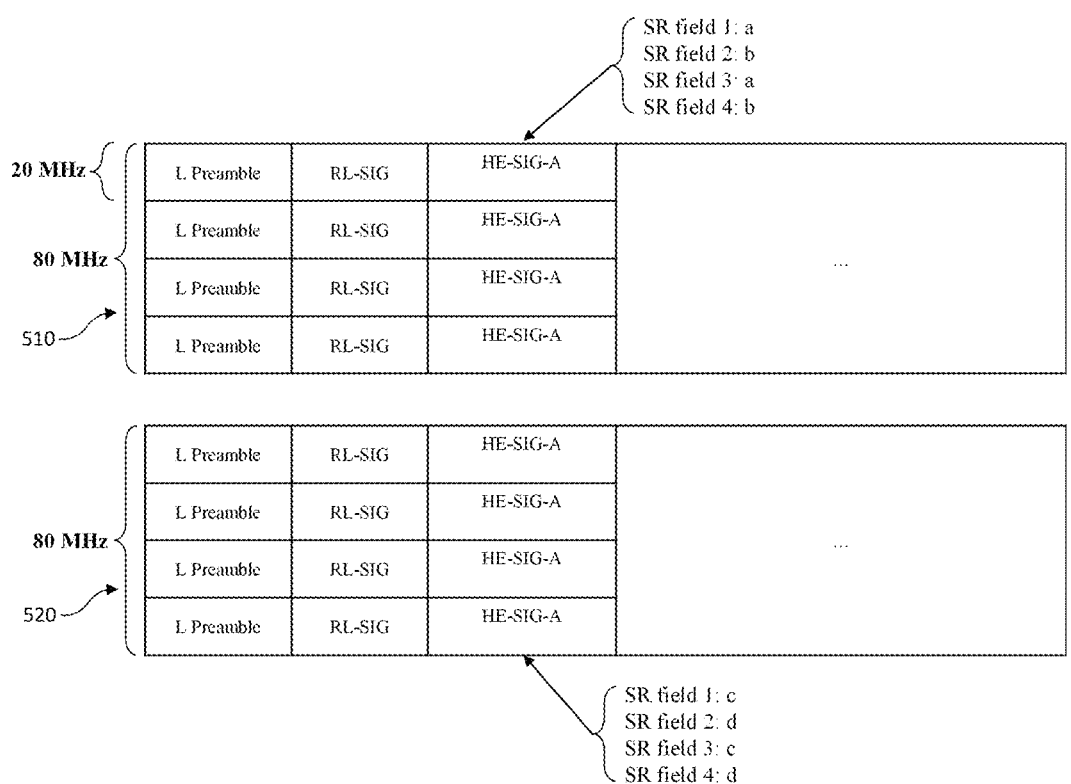

FIG. 16 illustrates a method for configuring an HE-SIG-A and spatial reuse fields of the trigger-based PPDU according to another embodiment of the present invention. According to the embodiment of FIG. 16, when the total bandwidth on which the trigger-based PPDUs 510 and 520 are transmitted is 80+80 MHz, the SR fields for the first frequency band may be set to the same value as the SR fields for the second frequency band.

As described above, STAs transmitting the trigger-based PPDU 510, 520 may carry the SRP information obtained from the trigger frame through the SR field of the trigger-based PPDU 510, 520. In this case, the STA may repeatedly insert two pieces of SRP information into the SR fields. For example, the SRP information for each subband obtained from the trigger frame may be a, b, c and d. a and b may be SRP information for the first frequency band, and c and d may be SRP information for the second frequency band. In this case, a, b, a, and b may be respectively contained in the first SR field to the fourth SR field of the trigger-based PPDU 510 transmitted on the first frequency band. Also, c, d, c, and d may be respectively contained in the first SR field to the fourth SR field of the trigger-based PPDU 520 transmitted on the second frequency band. That is, the first SR field and the second SR field for the first frequency band are respectively set to the same values as the third SR field and the fourth SR field for the second frequency band. As described above, the first frequency band and the second frequency band may indicate a high (or low) physical frequency band and a low (or high) physical frequency band, respectively. Alternatively, the first frequency band and the second frequency band may indicate a band of the P80 channel and a band of the S80 channel, respectively.

An OBSS terminal receiving the trigger-based PPDUs 510, 520 obtains the first SRP from at least one of the first SR field and the third SR field of the received PPDUs 510, 520. That is, since the information indicated by the first SR field and the second SR field is the same as the information indicated by the third SR field and the fourth SR field, the ambiguity of the SR field identification of the OBSS terminal can be solved. According to the embodiment, the SRP information a, b, c, and d transmitted by the trigger frame can be set in various rules. According to an embodiment, a and b may represent SRPs for the low frequency band, and c and d may represent SRPs for the high frequency band. According to another embodiment, a and b may represent SRPs for the high frequency band and c and d may represent SRPs for the low frequency band. According to yet another embodiment, a and b may be set to the same values as c and d, respectively.

Figure 17:
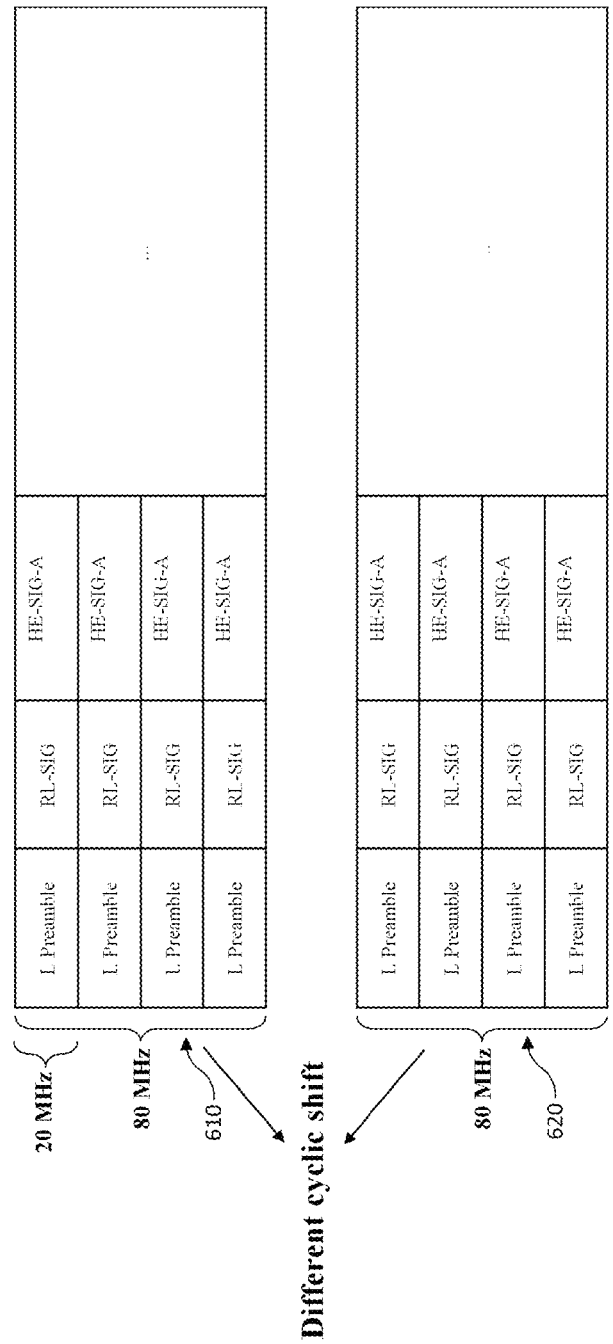

FIG. 17 illustrates a method for configuring an HE-SIG-A and spatial reuse fields of the trigger-based PPDU according to yet another embodiment of the present invention. According to the embodiment of FIG. 17, SR fields for the first frequency band and SR fields for the second frequency band may be identified through a physical signaling method.

More specifically, a cyclic shift value of the trigger-based PPDU 610 transmitted on the first frequency band may be set differently from a cyclic shift value of the trigger-based PPDU 620 transmitted on the second frequency band. In this case, the first cyclic shift value applied to the first frequency band and the second cyclic shift value applied to the second frequency band may be designated in advance. Accordingly, an OBSS terminal receiving the trigger-based PPDU 610 to which the first cyclic shift value is applied obtains SRP information for the corresponding subband from at least one of the first SR field and the second SR field of the corresponding PPDU 610. In addition, an OBSS terminal receiving the trigger-based PPDU 620 to which the second cyclic shift value is applied obtains SRP information for the corresponding subband from at least one of the third SR field and the fourth SR field of the corresponding PPDU 620.

Figure 18:
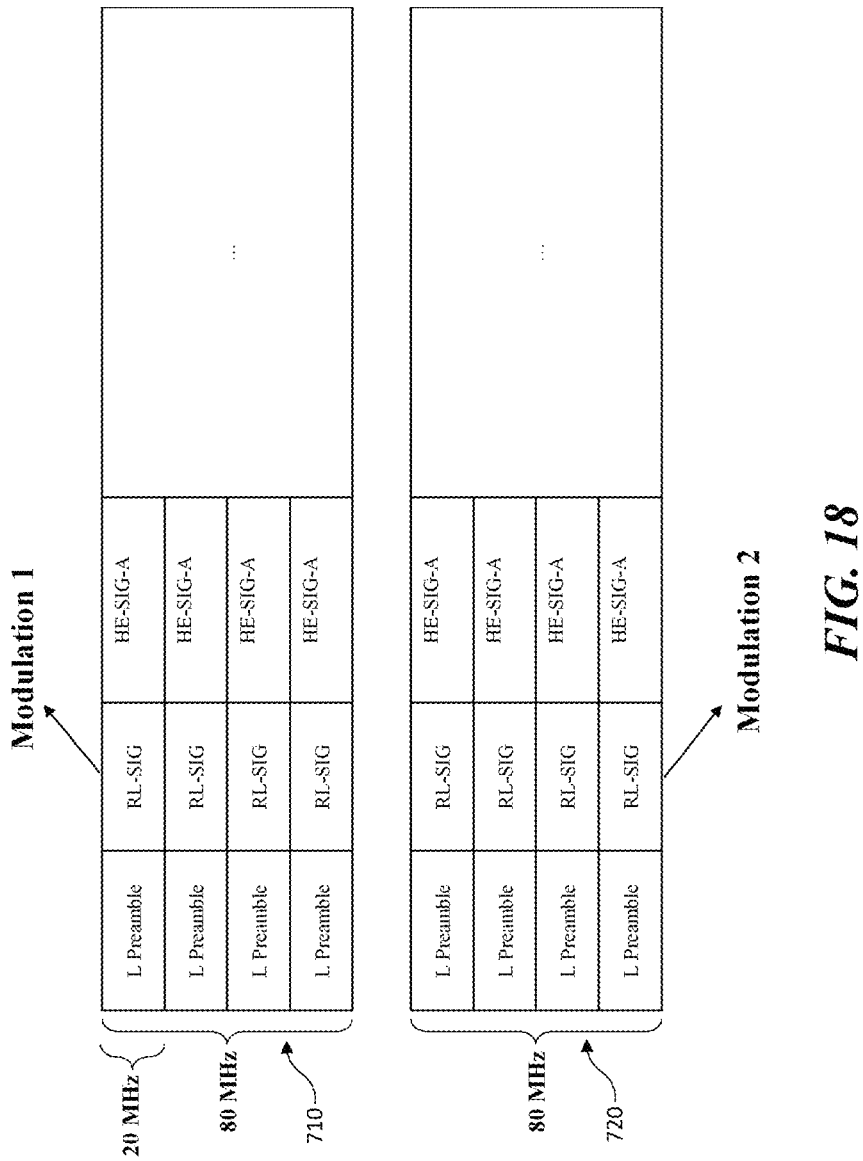

FIG. 18 illustrates a method for configuring an HE-SIG-A and spatial reuse fields of the trigger-based PPDU according to still another embodiment of the present invention. According to the embodiment of FIG. 18, SR fields for the first frequency band and SR fields for the second frequency band may be identified through a physical signaling method.

More specifically, a modulation scheme applied to a specific field of the trigger-based PPDU 710 transmitted on the first frequency band may be set differently from a modulation scheme applied to a specific field of the trigger-based PPDU 720 transmitted on the second frequency band. In this case, the first modulation scheme applied to the specific field transmitted through the first frequency band and the second modulation scheme applied to the specific field transmitted through the second frequency band may be designated in advance. According to an embodiment of the present invention, the specific field to which different modulation schemes are applied according to the frequency band may be a repeated L-SIG (RL-SIG).

Accordingly, an OBSS terminal receiving the trigger-based PPDU 710 including the RL-SIG to which the first modulation scheme is applied obtains the SRP information for the corresponding subband from at least one of the first SR field and the second SR field of the PPDU 710. In addition, an OBSS terminal receiving the trigger-based PPDU 720 including the RL-SIG to which the second modulation scheme is applied obtains the SRP information for the corresponding subband from at least one of the third SR field and the fourth SR field of the PPDU 720.

Figure 19:
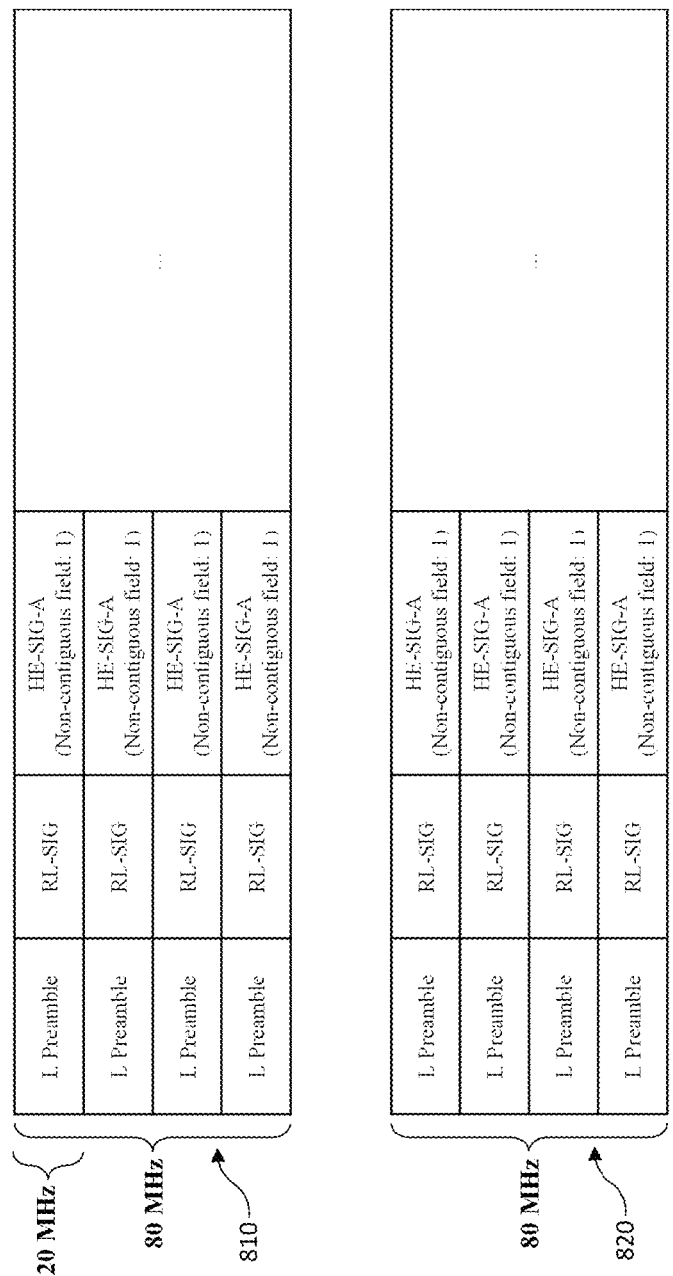

FIG. 19 illustrates a method for configuring an HE-SIG-A and spatial reuse fields of the trigger-based PPDU according to still yet another embodiment of the present invention. According to the embodiment of FIG. 19, the HE-SIG-A of a PPDU in an HE format may contain a non-contiguous band indicator indicating whether the total bandwidth on which the PPDU is transmitted is non-contiguous. Accordingly, whether the total bandwidth on which the trigger-based PPDU(s) are transmitted is contiguous 160 MHz or non-contiguous 80+80 MHz can be identified through the non-contiguous band indicator.

An OBSS terminal receiving the trigger-based PPDUs 810, 820 may determine the SR operation based on the non-contiguous band indicator of the received PPDUs 810, 820. If the non-contiguous band indicator is set to 0 (i.e., if the total bandwidth on which the PPDU is transmitted is contiguous), the OBSS terminal can identify each subband constituting the total bandwidth on which the PPDU is transmitted and an SR field corresponding thereto. Accordingly, the OBSS terminal may perform the SR operation based on the obtained SR field. However, as shown in FIG. 19, if the non-contiguous band indicator is set to 1 (i.e., if the total bandwidth on which the PPDU is transmitted is non-contiguous), the OBSS terminal cannot identify each sub-band constituting the total bandwidth on which the PPDU is transmitted and an SR field corresponding thereto. Therefore, the OBSS terminal may not perform the above SR operation.

Meanwhile, as described above, in the above embodiments, the first frequency band and the second frequency band may indicate a high (or low) physical frequency band and a low (or high) physical frequency band, respectively. However, according to another embodiment of the present invention, the first frequency band and the second frequency band may indicate a band of the P80 channel and a band of the S80 channel, respectively.

FIGS. 20 and 21 illustrate another embodiment of a method for setting spatial reuse fields of a trigger-based PPDU. As described above, when the total bandwidth on which the trigger-based PPDUs are transmitted is 160 MHz (or 80+80 MHz), each SR field of the trigger-based PPDU may indicate an SRP for the individual subband in units of 40 MHz.

According to an embodiment of the present invention, when the total bandwidth on which the trigger-based PPDU(s) are transmitted is a contiguous frequency band (e.g., 80 MHz, 160 MHz, etc.), the physical band that constitutes the total bandwidth is determined by a predetermined rule. Thus, an OBSS terminal receiving the trigger-based PPDU transmitted on a contiguous frequency band can identify the physical band on which the trigger-based PPDU(s) are transmitted. However, when the total bandwidth on which the trigger-based PPDU(s) are transmitted consists of non-contiguous frequency bands (e.g., 80+80 MHz), the physical bands that constitute the total bandwidth may not be predetermined. Accordingly, an OBSS terminal receiving the trigger-based PPDU transmitted on the non-contiguous frequency bands cannot identify which frequency band the SR fields of the corresponding PPDU are for. More specifically, when the total bandwidth on which the trigger-based PPDU(s) are transmitted is 80+80 MHz, the OBSS terminal cannot identify the set from which the SRP for the subband on which the PPDU is received can be obtained among the first set of SR fields (i.e., at least one of the first SR field and the second SR field) and the second set of SR fields (i.e., at least one of the third SR field and the fourth SR field). Accordingly, when the trigger-based PPDU is transmitted on non-contiguous frequency bands, there is a need for a method for resolving the ambiguity of the SR field identification of the OBSS terminals receiving it.

FIG. 20 illustrates another embodiment of a method for setting spatial reuse fields of a trigger-based PPDU in order to solve such a problem. According to the embodiment of FIG. 20, when the total bandwidth on which the trigger-based PPDU(s) are transmitted is 80+80 MHz, a representative value among SRPs for two 40 MHz bands corresponding to each other may be set to an SRP for the corresponding bands. More specifically, a representative value among the SRP for the first 40 MHz band and the SRP for the third 40 MHz band may be used as the first SRP for the first 40 MHz band and the third 40 MHz band. Thus, the first SR field and the third SR field of the trigger-based PPDU represent the same representative value. Likewise, a representative value among the SRP for the second 40 MHz band and the SRP for the fourth 40 MHz band may be used as the second SRP for the second 40 MHz band and the fourth 40 MHz band. Thus, the second SR field and the fourth SR field of the trigger-based PPDU represent the same representative value. In this case, the first 40 MHz band and the second 40 MHz band constitute the first frequency band on which the trigger-based PPDU(s) are transmitted, and the third 40 MHz band and the fourth 40 MHz band constitute the second frequency band on which the trigger-based PPDU(s) are transmitted. According to the embodiment of the present invention, a smaller value among the plurality of SRPs may be set as a representative value of the corresponding SRPs.

An OBSS terminal receiving the trigger-based PPDU having a total bandwidth of 80+80 MHz may obtain the first SRP from at least one of the first SR field and the third SR field of the received PPDU, and may obtain the second SRP from at least one of the second SR field and the fourth SR field of the received PPDU. That is, since the information indicated by the first SR field and the second SR field is the same as the information indicated by the third SR field and the fourth SR field, the ambiguity of the SR field identification of the OBSS terminal can be solved.

On the other hand, when the total bandwidth on which the trigger-based PPDU(s) are transmitted is 160 MHz, each SR field may indicate an SRP for the different subbands in 40 MHz units. That is, the first SR field indicates the SRP for the first 40 MHz band, the second SR field indicates the SRP for the second 40 MHz band, the third SR field indicates the SRP for the third 40 MHz band, and the fourth SR field indicates the SRP for the fourth 40 MHz band. In this case, the first 40 MHz band to the fourth 40 MHz band constitute the total bandwidth 160 MHz on which the trigger-based PPDU(s) are transmitted. As such, by allowing the SR fields of the trigger-based PPDU transmitted on contiguous frequency band to indicate SRPs for individual subbands, an SR operation that is more suitable for individual subbands can be performed.

FIG. 21 illustrates yet another embodiment of a method for setting and using spatial reuse fields of a trigger-based PPDU. According to the embodiment of FIG. 21, each SR field of the trigger-based PPDU may indicate an SRP for different subbands, and an OBSS terminal receiving the PPDU may select an SRP for the SR operation of the corresponding subband among SRPs indicated by a plurality of SR fields.

More specifically, even if the total bandwidth on which the trigger-based PPDU(s) are transmitted is 80+80 MHz, each SR field may indicate an SRP for the different subbands in units of 40 MHz. That is, the first SR field indicates the SRP for the first 40 MHz band, the second SR field indicates the SRP for the second 40 MHz band, the third SR field indicates the SRP for the third 40 MHz band, and the fourth SR field indicates the SRP for the fourth 40 MHz band. In this case, the first 40 MHz band and the second 40 MHz band constitute the first frequency band on which the trigger-based PPDU(s) are transmitted, and the third 40 MHz band and the fourth 40 MHz band constitute the second frequency band on which the trigger-based PPDU(s) are transmitted.

An OBSS terminal receiving the trigger-based PPDU having a total bandwidth of 80+80 MHz uses a smaller value between the two SR fields corresponding to each other as an SRP for the corresponding subband. That is, the smaller value between the first SR field value and the third SR field value is used for the SRP for the first 40 MHz band and/or the third 40 MHz band. In addition, the smaller value between the second SR field value and the fourth SR field value is used for the SRP for the second 40 MHz band and/or the fourth 40 MHz band.

Figure 22:
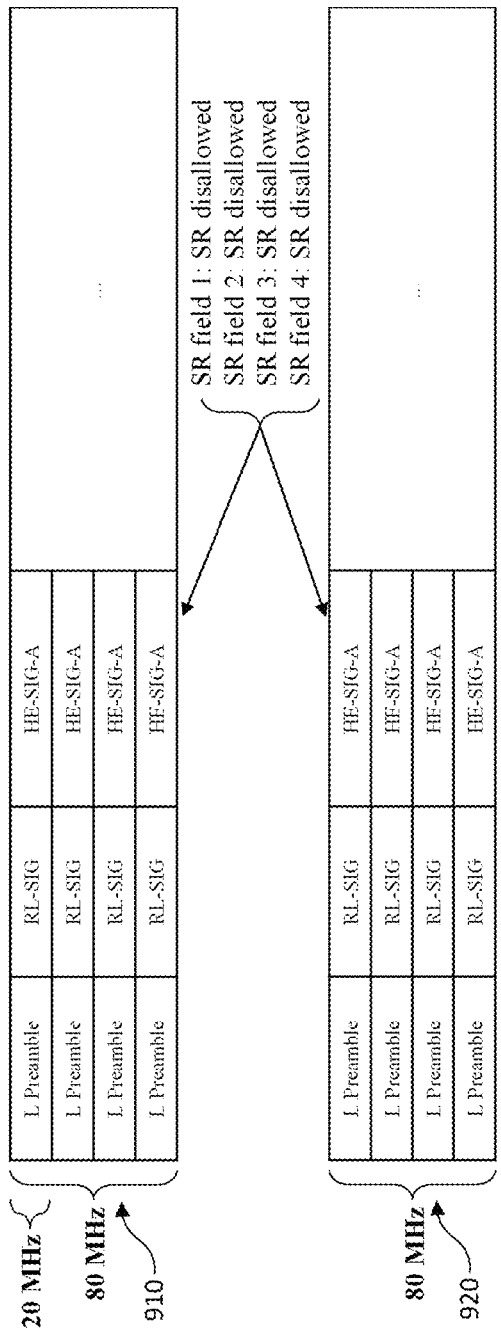
FIG. 22 illustrates a method for configuring an HE-SIG-A and spatial reuse fields of a trigger-based PPDU according to a further embodiment of the present invention.

FIG. 22 illustrates a method for configuring an HE-SIG-A and spatial reuse fields of a trigger-based PPDU according to a further embodiment of the present invention. According to the embodiment of FIG. 22, in order to solve the ambiguity of the SR field identification of the OBSS terminal described above, the SR operation may be restricted in the trigger-based PPDU transmitted on the non-contiguous frequency bands. More specifically, the SR fields of the trigger-based PPDUs 910, 920 transmitted on the 80+80 MHz band may indicate a predetermined value not allowing the SR operation. To this end, the AP may carry an SRP indicating a predetermined value not allowing the SR operation through the trigger frame.

FIG. 23 illustrates a method for signaling spatial reuse fields of a trigger-based PPDU according to another embodiment of the present invention. According to the embodiment of FIG. 23, when the total bandwidth indicated by the bandwidth field of the trigger-based PPDU is 80+80 MHz or 160 MHz, the SR field may indicate an SRP for a subband of 20 MHz bandwidth. In the embodiment of FIG. 23, when the total bandwidth on which the trigger-based PPDU(s) are transmitted is 20 MHz, 40 MHz, or 80 MHz, the value indicated by each SR field is the same as that illustrated in FIG. 13.

According to the embodiment of FIG. 23, when the total bandwidth on which the trigger-based PPDU(s) are transmitted is 160 MHz (or 80+80 MHz), the values of the SR fields for the first 80 MHz frequency band may be set different from the values of the SR fields for the second 80 MHz frequency band. That is, the first SR field to the fourth SR field of the trigger-based PPDU transmitted on the first frequency band respectively indicate SRPs for the first 20 MHz band to the fourth 20 MHz band of the first frequency band. In addition, the first SR field to the fourth SR field of the trigger-based PPDU transmitted on the second frequency band respectively indicate SRPs for the first 20 MHz band to the fourth 20 MHz band of the second frequency band. In this case, the first SR field to the fourth SR field for the first frequency band and the first SR field to the fourth SR field for the second frequency band may be determined independently from each other.

Thus, to indicate the SRP in units of 20 MHz in a total bandwidth of 160 MHz (or 80+80 MHz), a maximum of eight SRPs should be carried in the trigger frame. Therefore, the length of the trigger frame may be determined to be variable according to the total bandwidth information. That is, if the total bandwidth is 20 MHz, 40 MHz, or 80 MHz, the trigger frame carries a total of 16 bits of SRP, and if the total bandwidth is 160 MHz (or 80+80 MHz), the trigger frame carries a total of 32 bits of SRP.

FIG. 24 illustrates a method for signaling a bandwidth field according to an embodiment of the present invention. In the embodiments described above, it may be necessary to identify whether the total bandwidth on which the trigger-based PPDU(s) are transmitted is contiguous 160 MHz or non-contiguous 80+80 MHz. According to the embodiment of the present invention, whether or not the total bandwidth of the transmitted PPDU is contiguous may be signaled via the HE-SIG-A.

According to an embodiment of the present invention, as described above with reference to FIG. 19, the HE-SIG-A of a PPDU in an HE format may contain a non-contiguous band indicator. Thus, whether the total bandwidth on which the trigger-based PPDU(s) are transmitted is contiguous 160 MHz or non-contiguous 80+80 MHz can be identified through the non-contiguous band indicator.

According to another embodiment of the present invention, whether the total bandwidth of the transmitted PPDU is contiguous may be signaled through the bandwidth field of the HE-SIG-A as shown in FIG. 24. More specifically, the non-contiguous bandwidth may be indicated via a predetermined index of the bandwidth field of the HE-SIG-A. For example, the indices 0, 1, 2, and 3 of the bandwidth field may represent 20 MHz, 40 MHz, 80 MHz, and 160 MHz, respectively. In addition, the index 4 of the bandwidth field may represent non-contiguous 80+80 MHz. When the bandwidth field of the trigger-based PPDU indicates contiguous 160 MHz, an OBSS terminal receiving the PPDU may perform an SR operation for 160 MHz. However, when the bandwidth field of the trigger-based PPDU indicates non-contiguous 80+80 MHz, the OBSS terminal may perform an SR operation for 80 MHz including the subband on which the corresponding PPDU is received.

According to yet another embodiment of the present invention, whether the total bandwidth of the transmitted PPDU is contiguous may be identified according to whether the corresponding SR fields are set to the same value. For example, when the bandwidth field of the trigger-based PPDU indicates 160 MHz, and the first SR field and the second SR field are set to the same values as the third SR field and the fourth SR field, respectively, the total bandwidth on which the trigger-based PPDU(s) are transmitted may be identified as 80+80 MHz.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A wireless communication terminal, the terminal comprising:
a processor; and
a communication unit,
wherein the processor is configured to:
receive a trigger frame soliciting uplink multi-user transmission, and
transmit a trigger-based physical protocol data unit (PPDU) including a bandwidth field and a plurality of spatial reuse fields in response to the trigger frame,
wherein the bandwidth field indicates a bandwidth related to transmission and reception of the trigger-based PPDU,
wherein a frequency band in which the plurality of spatial reuse fields is applied and spatial reuse parameters of the plurality of spatial reuse fields vary according to a size of the bandwidth indicated by the bandwidth field, and
wherein, when the bandwidth field indicates 160 MHz, a first spatial reuse field included in the plurality of spatial reuse fields indicates a spatial reuse parameter for a first 80 MHz subband and
a second spatial reuse field included in the plurality of spatial reuse fields indicates a spatial reuse parameter for a second 80 MHz subband.

2. The wireless communication terminal of claim 1,
wherein the frequency band to which each of the plurality of spatial reuse fields is applied is 20 MHz subchannel when the bandwidth field indicates 20 MHz or 40 MHz.

3. The wireless communication terminal of claim 1,
wherein the plurality of spatial reuse fields includes the first spatial reuse field and the second spatial reuse field, and
wherein a value of the first spatial reuse field is set equal to a value of the second spatial reuse field when the bandwidth indicated by the bandwidth field is a specific bandwidth.

4. The wireless communication terminal of claim 1,
wherein each of the plurality of spatial reuse fields includes a spatial reuse parameter for a spatial reuse operation of an overlapping basic service set (OBSS) terminal.

5. The wireless communication terminal of claim 1,
wherein the spatial reuse parameter indicated by the first spatial reuse field applies to each 20 MHz subchannel of the first 80 MHz subband, and
wherein the spatial reuse parameter indicated by the second spatial reuse field applies to each 20 M-Hz subchannel of the second 80 MHz subband.

6. A wireless communication method of a wireless communication terminal, the method comprising:
receiving a trigger frame soliciting uplink multi-user transmission; and
transmitting a trigger-based physical protocol data unit (PPDU) including a bandwidth field and a plurality of spatial reuse fields in response to the trigger frame,
wherein the bandwidth field indicates a bandwidth related to transmission and reception of the trigger-based PPDU,
wherein a frequency band in which the plurality of spatial reuse fields is applied and spatial reuse parameters of the plurality of spatial reuse fields vary according to a size of the bandwidth indicated by the bandwidth field, and
wherein, when the bandwidth field indicates 160 MHz,
a first spatial reuse field included in the plurality of spatial reuse fields indicates a spatial reuse parameter for a first 80 MHz subband and
a second spatial reuse field included in the plurality of spatial reuse fields indicates a spatial reuse parameter for a second 80 MHz subband.

7. The wireless communication terminal of claim 6,
wherein the frequency band to which each of the plurality of spatial reuse fields is applied is 20 MHz subchannel when the bandwidth field indicates 20 MHz or 40 MHz.

8. The wireless communication terminal of claim 6,
wherein the plurality of spatial reuse fields includes the first spatial reuse field and the second spatial reuse field, and
wherein a value of the first spatial reuse field is set equal to a value of the second spatial reuse field when the bandwidth indicated by the bandwidth field is a specific bandwidth.

9. The wireless communication terminal of claim 6,
wherein each of the plurality of spatial reuse fields includes a spatial reuse parameter for a spatial reuse operation of an overlapping basic service set (OBSS) terminal.

10. The wireless communication terminal of claim 6,
wherein the spatial reuse parameter indicated by the first spatial reuse field applies to each 20 MHz subchannel of the first 80 MHz subband, and
wherein the spatial reuse parameter indicated by the second spatial reuse field applies to each 20 MHz subchannel of the second 80 MHz subband.

* * * * *